(12) United States Patent
Yang et al.

(10) Patent No.: US 10,476,641 B2
(45) Date of Patent: Nov. 12, 2019

(54) BACK-TO-BACK REFERENCE SIGNALS

(71) Applicant: QUALCOMM Incorporated, San Diego, CA (US)

(72) Inventors: Yang Yang, San Diego, CA (US); Tao Luo, San Diego, CA (US); Peter Pui Lok Ang, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 15/231,591

(22) Filed: Aug. 8, 2016

(65) Prior Publication Data

US 2017/0141896 A1    May 18, 2017

Related U.S. Application Data

(60) Provisional application No. 62/256,555, filed on Nov. 17, 2015.

(51) Int. Cl.
| | |
|---|---|
| *H04L 1/06* | (2006.01) |
| *H04B 7/06* | (2006.01) |
| *H04B 7/12* | (2006.01) |
| *H04L 5/00* | (2006.01) |

(Continued)

(52) U.S. Cl.
CPC .......... *H04L 5/0048* (2013.01); *H04B 7/068* (2013.01); *H04B 7/12* (2013.01); *H04L 1/0606* (2013.01); *H04L 5/003* (2013.01); *H04L 5/0023* (2013.01); *H04L 5/0039* (2013.01); *H04L 5/0062* (2013.01); *H04L 5/0073* (2013.01); *H04W 28/04* (2013.01); *H04W 72/0453* (2013.01); *H04W 72/0406* (2013.01)

(58) Field of Classification Search
CPC ...... H04W 72/00; H04W 40/00; H04W 24/00
USPC ................................... 370/328–339
See application file for complete search history.

(56) References Cited

U.S. PATENT DOCUMENTS

| | | | |
|---|---|---|---|
| 2009/0238131 A1* | 9/2009 | Montojo ............... | H04L 1/0606 370/329 |
| 2009/0285168 A1 | 11/2009 | Choi et al. | |

(Continued)

OTHER PUBLICATIONS

ISA/EP, International Search Report and Written Opinion of the International Searching Authority, Int'l Application No. PCT/US2016/061575, dated Feb. 2, 2017, European Patent Office, Rijswijk, NL, 14 pgs.

(Continued)

Primary Examiner — Iqbal Zaidi
(74) Attorney, Agent, or Firm — Holland & Hart LLP

(57) ABSTRACT

Methods, systems, and devices for wireless communication are described. A base station may select a two sets of reference signal resource elements (REs) for a symbol period, where each RE of the first set is contiguous to an RE of the second set. The base station may also identify resource element groups (REGs) for control signaling, where each REG covers one or more resource blocks (RBs). The base station may then perform interference cancellation, which may be based on an interference covariance matrix for each of the REGs. In some cases, the base station may coordinate with neighboring base stations (directly or through the core network) to ensure that the selected REGs do not partially overlap with reference signal transmissions or REGs of neighboring base stations.

60 Claims, 15 Drawing Sheets

(51) Int. Cl.
*H04W 28/04* (2009.01)
*H04W 72/04* (2009.01)

(56) References Cited

U.S. PATENT DOCUMENTS

| | | | | |
|---|---|---|---|---|
| 2011/0141982 | A1* | 6/2011 | Zhang | H04J 13/0062 370/329 |
| 2014/0307691 | A1 | 10/2014 | Zhang et al. | |
| 2015/0071183 | A1* | 3/2015 | Bontu | H04L 1/00 370/329 |
| 2015/0358102 | A1* | 12/2015 | Ko | H04J 11/0053 370/252 |

OTHER PUBLICATIONS

ZTE, "Views on Reference Advanced Receiver Structure for DL Control Channel IM," 3GPP TSG-RAN Working Group 4 (Radio) Meeting #76bis, R4-155739, Sophia Antipolis, France, Oct. 12-16, 2015, 6 pgs., XP051008886, 3rd Generation Partnership Project. Retrieved from the Internet: URL:http://www.3gpp.org/ftp/ Meetings 3GPPSYNC/RAN4/Docs/.

* cited by examiner

BACK-TO-BACK REFERENCE SIGNALS

CROSS REFERENCES

The present application for patent claims priority to U.S. Provisional Patent Application No. 62/256,555 by Yang et al., entitled "Back-To-Back Cell-Specific Reference Signals (CRS)," filed Nov. 17, 2015, assigned to the assignee hereof.

INTRODUCTION

The following relates generally to wireless communication, and more specifically to back-to-back reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a base station may transmit reference signals to a UE to aid in channel estimation. Reference signals may be transmitted using resource elements (REs) embedded within resources used for control channel signaling. In some cases, the REs used for reference signals by neighboring base stations may overlap, or partially overlap, with REs used for control signaling. This may reduce the effectiveness of interference cancellation between a base station and a UE, which may result in signal degradation and reduced throughput.

SUMMARY

In one example of the present disclosure, a base station may select two sets of reference signal REs for a symbol period. Each RE of a first set may be contiguous to an RE of the second set. The base station may also identify resource element groups (REGs) for control signaling. Each REG may cover one or more resource blocks (RBs). The base station may then perform interference cancellation, which may be based on an interference covariance matrix for each of the REGs. In some cases, the base station may coordinate with neighboring base stations (directly or through a core network) to ensure that the selected REGs do not partially overlap with reference signal transmissions or REGs of neighboring base stations.

A method of wireless communication is described. The method may include identifying a first set of one or more reference signal REs and a second set of one or more reference signal REs in a symbol period, where each reference signal RE of the first set of one or more reference signal REs is contiguous to a reference signal RE of the second set of one or more reference signal REs and identifying an REG including a plurality of REs in the symbol period, where one or more REs of the REG is contiguous to a reference signal RE of the first set of one or more reference signal REs or a reference signal RE of the second set of one or more reference signal REs.

An apparatus for wireless communication is described. The apparatus may include means for identifying a first set of one or more reference signal REs and a second set of one or more reference signal REs in a symbol period, where each reference signal RE of the first set of one or more reference signal REs is contiguous to a reference signal RE of the second set of one or more reference signal REs and means for identifying an REG including a plurality of REs in the symbol period, where one or more REs of the REG is contiguous to a reference signal RE of the first set of one or more reference signal REs or a reference signal RE of the second set of one or more reference signal REs.

Another apparatus for wireless communication is described. The apparatus may include a processor, memory in electronic communication with the processor, and instructions stored in the memory. The instructions may be operable to cause the processor to identify a first set of one or more reference signal REs and a second set of one or more reference signal REs in a symbol period, where each reference signal RE of the first set of one or more reference signal REs is contiguous to a reference signal RE of the second set of one or more reference signal REs and identify an REG including a plurality of REs in the symbol period, where one or more REs of the REG is contiguous to a reference signal RE of the first set of one or more reference signal REs or a reference signal RE of the second set of one or more reference signal REs.

A non-transitory computer readable medium for wireless communication is described. The non-transitory computer-readable medium may include instructions operable to cause a processor to identify a first set of one or more reference signal REs and a second set of one or more reference signal REs in a symbol period, where each reference signal RE of the first set of one or more reference signal REs is contiguous to a reference signal RE of the second set of one or more reference signal REs and identify an REG including a plurality of REs in the symbol period, where one or more REs of the REG is contiguous to a reference signal RE of the first set of one or more reference signal REs or a reference signal RE of the second set of one or more reference signal REs.

Some examples of the method, apparatus, and non-transitory computer-readable medium described above may further include processes, features, means, or instructions for transmitting a first reference signal using the first set of one or more reference signal REs, a second reference signal using the second set of one or more reference signal REs, and a control message using a set of REGs including the REG. Some examples of the method, apparatus, and non-transitory computer-readable medium described above may further include processes, features, means, or instructions for performing interference cancellation for one or more REGs of the set of REGs.

Some examples of the method, apparatus, and non-transitory computer-readable medium described above may further include processes, features, means, or instructions for calculating an interference covariance matrix for each of the one or more REGs, where the interference cancellation may be performed based at least in part on the interference covariance matrix. Some examples of the method, apparatus, and non-transitory computer-readable medium described above may further include processes, features, means, or instructions for determining that a neighboring base station uses a reference signal configuration based on contiguous reference signal REs, where performing the interference cancellation may be performed based at least in part on the determination.

Some examples of the method, apparatus, and non-transitory computer-readable medium described above may further include processes, features, means, or instructions for coordinating an REG pattern with the neighboring base station or a core network entity, where the REG pattern prevents partially overlapping REGs from different base stations, and where the interference cancellation may be performed based at least in part on the REG pattern.

Some examples of the method, apparatus, and non-transitory computer-readable medium described above may further include processes, features, means, or instructions for coordinating an REG pattern with the neighboring base station or a core network entity, where the REG pattern minimizes a probability that two base stations use an overlapping REG, and where the interference cancellation may be performed based at least in part on the REG pattern. In some examples of the method, apparatus, and non-transitory computer-readable medium described above, the first reference signal may be associated with a first antenna port and the second reference signal may be associated with a second antenna port.

In some examples of the method, apparatus, and non-transitory computer-readable medium described above, the control message may be transmitted using a space frequency block code (SFBC). In some examples of the method, apparatus, and non-transitory computer-readable medium described above, the SFBC may be based at least in part on distributing a set of symbols of the control message to a set of RE pairs of the SFBC. In some examples of the method, apparatus, and non-transitory computer-readable medium described above, each RE pair of the SFBC may be separated by a reference signal RE of the first set of one or more reference signal REs or the second set of one or more reference signal REs.

In some examples of the method, apparatus, and non-transitory computer-readable medium described above, REs of each RE pair of the set of RE pairs may be contiguous. Some examples of the method, apparatus, and non-transitory computer-readable medium described above may further include processes, features, means, or instructions for receiving a first reference signal using the first set of one or more reference signal REs, a second reference signal using the second set of one or more reference signal REs and a control message using a set of REGs including the REG.

In some examples of the method, apparatus, and non-transitory computer-readable medium described above, the first set of one or more reference signal REs, the second set of one or more reference signal REs, and the REG include one or more RBs of frequency tones. In some examples of the method, apparatus, and non-transitory computer-readable medium described above, the first set of one or more reference signal REs and the second set of one or more reference signal REs combined comprise one half of the frequency tones of an RB.

In some examples of the method, apparatus, and non-transitory computer-readable medium described above, the first set of one or more reference signal REs and the second set of one or more reference signal REs combined comprise one third of the frequency tones of an RB. In some examples of the method, apparatus, and non-transitory computer-readable medium described above, the symbol period includes a first symbol period of a transmission time interval (TTI).

DETAILED DESCRIPTION

In one example of the present disclosure, a base station may perform interference cancellation on control messages while communicating directly with a UE. A control message may contain multiple REGs, where the REG is a basic resource unit for assigning resources in the control region of a transmission. The REGs may be interspersed with pilot signals, such as reference signals (e.g., cell-specific reference signals (CRS)), to help identify the channel gain and enable the UE to coherently decode the control message. In some cases, the REG may also include a coding scheme used for transmission diversity (e.g., an SFBC), which may be based on the spacing of antenna ports and subcarrier frequencies.

A UE may encounter mixed data and reference signal interference when communicating with a base station, even within a relatively small control region. Additionally, partially overlapping control resource elements from neighboring cells (e.g., partially overlapping REGs during a first symbol) can create inefficient interference measurements at the UE. Thus, the misalignment of control resources across different cells may inhibit effective interference measurements at the UE, which may translate into inefficiencies in cancelling inter-cell control channel interference. Inter-cell interference may also impair SFBC orthogonality.

However, a control channel may be configured to enable robust inter-cell control channel interference cancelling capabilities and a reduced control channel error rate. Some control channel configurations may further enable a reduction in complexity associated with inter-cell control channel coordination by base stations. For example, the control channel resource granularity may be configured to the RB level, and reference signal tones for different transmit antenna ports may be inserted in a back-to-back configuration.

Aspects of the disclosure are initially described in the context of a wireless communication system. Further examples are provided of control channel configurations using reference signals transmitted in consecutive subcarriers. Aspects of the disclosure are further illustrated by and described with reference to apparatus diagrams, system diagrams, and flowcharts that relate to back-to-back reference signals.

Figure 1:
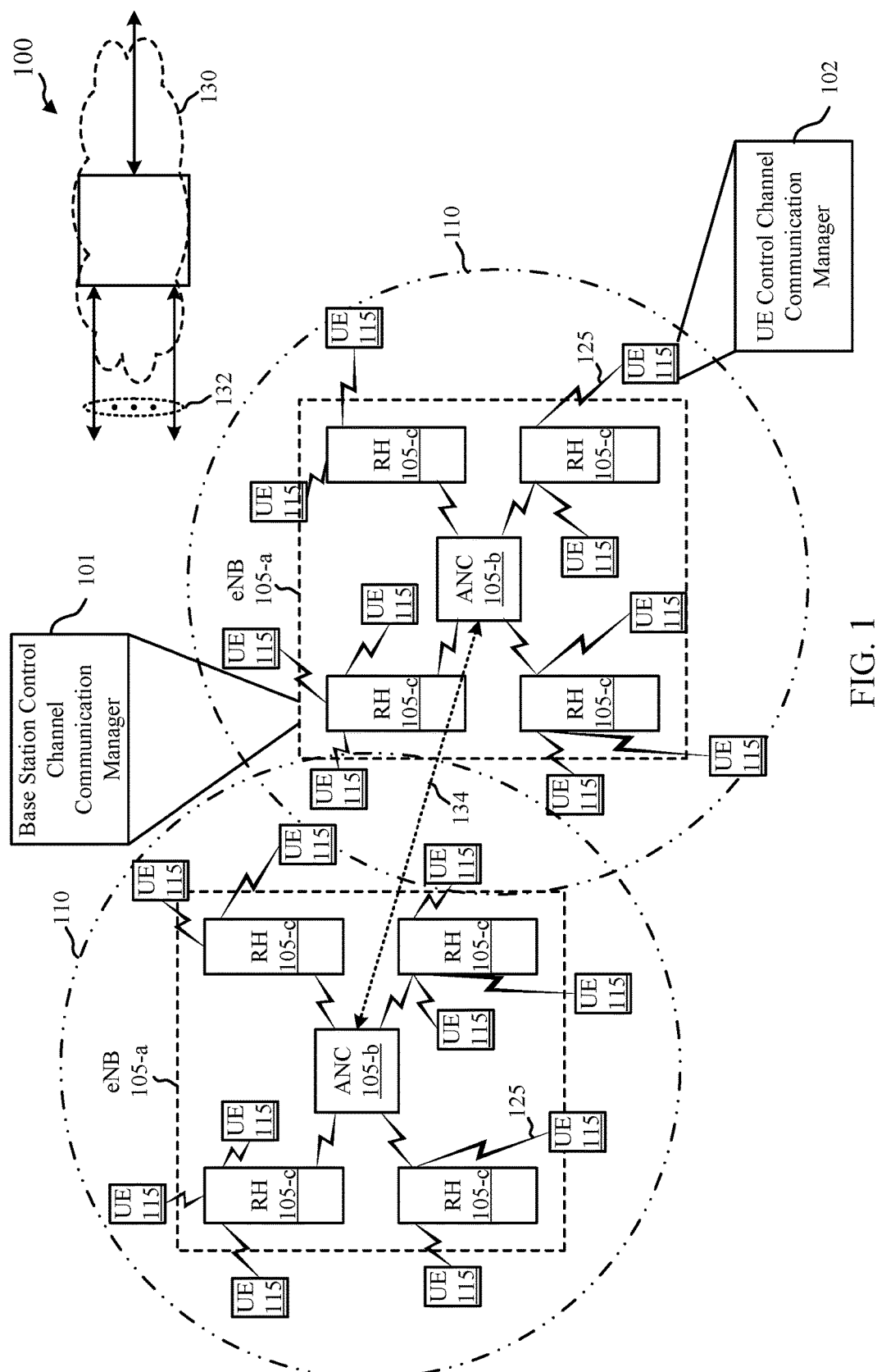
FIG. 1 illustrates an example of a wireless communications system that supports back-to-back reference signals, in accordance with one or more aspects of the present disclosure.

FIG. 1 illustrates an example of a wireless communication system 100, in accordance with one or more aspects of the disclosure. The wireless communication system 100 may include network access devices 105, UEs 115, and a core network 130. Wireless communications system 100 may support integrated control and data within RBs to improve efficiency for control information transmission.

The core network 130 may provide user authentication, access authorization, tracking, Internet Protocol (IP) connectivity, and other access, routing, or mobility functions. At least some of the network access devices 105 (e.g., eNBs 105-a or access node controllers (ANCs) 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (radio heads) 105-c. In an alternative configuration of the wireless communication system 100, the functionality of an ANC 105-b may be provided by a radio head 105-c or distributed across the radio heads 105-c of an eNB 105-a. In another alternative configuration of the wireless communication system 100, the radio heads 105-c may be replaced with base stations, and the ANCs 105-c may be replaced by base station controllers (or links to the core network 130).

The ANCs 105-b may wirelessly communicate with the UEs 115 via one or more radio heads 105-c, with each radio head 105-c having one or more antennas. Each of the radio heads 105-c may provide communication coverage for a respective geographic coverage area 110. The geographic coverage area 110 for a radio head 105-c may be divided into sectors making up only a portion of the coverage area (not shown). In some examples, the network access devices 105 may be replaced with alternative network access devices, such as base transceiver stations, radio base stations, access points, radio transceivers, NodeBs, eNodeBs (eNBs), Home NodeBs, Home eNodeBs, etc. The wireless communication system 100 may include radio heads 105-c (or base stations 105 or other network access devices) of different types (e.g., macro cell and/or small cell network access devices). The geographic coverage areas 110 of the radio heads 105-c or other network access devices may overlap. In some examples, different eNBs 105-a may be associated with different radio access technologies.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE 115 may be able to communicate with various types of eNBs 105-a, radio heads 105-c, base stations 105, access points, or other network access devices, including macro eNBs, small cell eNBs, relay base stations, and the like. A UE may also be able to communicate directly with other UEs 115 (e.g., using a peer-to-peer (P2P) protocol).

In some examples, the wireless communication system 100 may include a 5G network. In other examples, the wireless communication system 100 may include an LTE/LTE-A network. The wireless communication system 100 may in some cases be a heterogeneous network, in which different types of eNBs provide coverage for various geographical regions. For example, each eNB 105-a or radio head 105-c may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base station 105 may include base station control channel communication manager 101, which may identify a first set of one or more reference signal REs and a second set of one or more reference signal REs in a symbol period, where each reference signal RE of the first set is contiguous to a reference signal RE of the second set. Base station control channel communication manager 101 may identify one or more REGs including a set of REs in the symbol period, where one or more REs of the REG is contiguous to a reference signal RE of the first set of reference signal REs or a reference signal RE of the second set of reference signal REs. Base station control channel communication manager 101 or UE control channel communication manager 102 may be an example of control channel communication manager 510 described with reference to FIG. 5.

A frame structure may be used to organize physical (PHY) resources. A frame may be a 10 ms interval that may be further divided into 10 equally sized subframes. Each subframe may include two consecutive time slots. Each slot may include six or seven OFDMA symbol periods. An RE consists of one symbol period and one subcarrier (i.e., a 15 KHz frequency range). An RB may contain 12 consecutive subcarriers in the frequency domain and, for a normal cyclic prefix (CP) in each orthogonal frequency division multiplexed (OFDM) symbol, 7 consecutive OFDM symbols in the time domain (1 slot), or 84 REs.

Some REs may be designated as control region REs, and may be grouped into REGs. An REG may be the smallest unit of scheduling for control messages. Multiple REGs may be combined to form a control channel element (CCE). In some wireless systems, an REG may include four REs. In other cases, an REG may cover each RE in one or more RBs that is not used for transmission of reference signals (i.e., RB level REG granularity).

A base station 105 may insert periodic pilot symbols, such as reference signals (e.g., CRS), to aid UEs 115 in channel estimation and coherent demodulation, where certain reference signals may include one of 504 different cell identities. Reference signals may be modulated using quadrature phase shift keying (QPSK) and power boosted (e.g., transmitted at 6 dB higher than the surrounding data elements) to make them resilient to noise and interference. Reference signals may be embedded in 4 to 16 REs in each RB based on the number of antenna ports or layers (up to 4) of the receiving UEs 115. In some cases, reference signals for different antenna ports may be transmitted in contiguous REs to aid in interference cancellation and interference cancellation coordination between base stations 105.

In some cases, wireless communications system 100 may utilize one or more enhanced component carrier (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that may not be capable of monitoring the whole bandwidth or prefer to use a limited bandwidth (e.g., to conserve power).

In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions).

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARD) related control information.

Thus, a base station 105 may select two sets of reference signal REs for a symbol period, where each RE of the first set is contiguous to an RE of the second set. The base station may also identify REGs for control signaling, where each REG covers one or more RBs. The base station may then perform interference cancellation, which may be based on an interference covariance matrix for each of the REGs. In some cases, the base station may coordinate with neighboring base stations (directly or through the core network) to ensure that the selected REGs do not partially overlap with reference signal transmissions or REGs of neighboring base stations.

Figure 2:
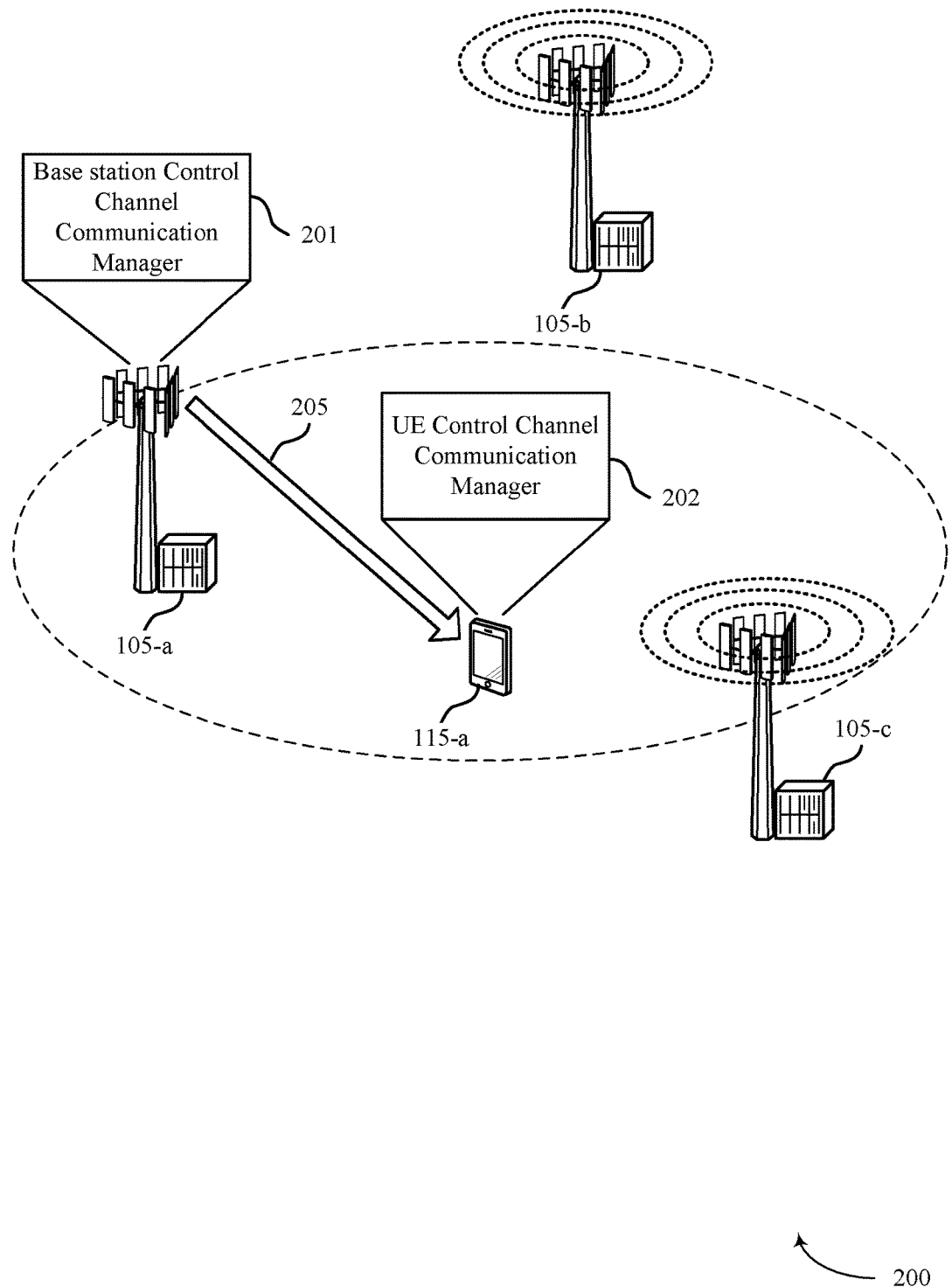
FIG. 2 illustrates an example of a wireless communications system that supports back-to-back reference signals, in accordance with one or more aspects of the present disclosure.

FIG. 2 illustrates an example of a wireless communications system 200 that supports back-to-back reference signals, in accordance with one or more aspects of the present disclosure. Wireless communications system 200 may include base station 105-a and UE 115-a, which may be examples of the corresponding devices described with reference to FIG. 1. Base station 105-a and UE 115-a may communicate over wireless link 205. Wireless communications system 200 may support back-to-back reference signals and RB-level REGs to improve control channel interference cancellation.

Base station 105-a and UE 115-a may include base station control channel communication manager 201 and UE control channel communication manager 202, respectively, which may be used to identify a first set of one or more reference signal REs and a second set of one or more reference signal REs in a symbol period, where each reference signal RE of the first set is contiguous to a reference signal RE of the second set, and identify one or more REGs including a set of REs in the symbol period, where one or more REs of the REG is contiguous to a reference signal RE of the first set or a reference signal RE of the second set. Base station control channel communication manager 201 or UE control channel communication manager 202 may be an example of a control channel communication manager 510 described with reference to FIG. 5.

In wireless communications system 200, base station 105-a may perform interference cancellation on control messages while communicating with UE 115-a. The control messages may contain multiple REGs, where an REG may act as the basic unit for assignment of resources in a control region. Control region RBs may also contain pilot or reference signals, such as CRS, to identify the channel gain and enable UE 115-a to coherently decode the control message. In some cases, REGs may also be associated with a coding scheme used for transmission diversity (e.g., an SFBC), which may be based on the spacing of antenna ports and subcarrier frequencies. Interference measurements performed by the UE may be based on an average of the interference experienced within each REG.

UE 115-a may encounter mixed data and reference signal interference when communicating with base station 105-a, even within a relatively small control region. Additionally, partially overlapping control transmissions from base stations 105 in neighboring cells (e.g., base stations 105-b and/or 105-c) may create inaccurate interference measurements at UE 115-a. That is, a misalignment of control resources across different cells may inhibit effective interference measurements by UE 115-a, which may translate into inefficiencies in cancelling inter-cell control channel interference. In some cases, base stations 105 of neighboring cells may attempt complex inter-cell control coordination processes in an effort to reduce interference. Using back-to-back reference signal REs (e.g., where REs from a first set of reference signal REs and second set of reference signal REs are contiguous) and RB-level REG granularity may simplify this coordination.

As an example, when UE 115-a is attempting to decode a CCE received from base station 105-a, a pilot tone from a second base station (e.g., base station 105-b) may interfere with the CCE (i.e., pilot-on-control interference). Additionally or alternatively, during a subsequent CCE, interference may be caused by another CCE from the second base station (i.e., control-on-control interference). In some cases, these different types of interference may take place within a single SFBC tone pair, such as when additional control transmissions from a third base station (e.g., base station 105-c) interfere with UE 115-a. Partial overlap of REGs may also result in an inaccurate interference covariance matrix calculation. For example, insufficient interference averaging may occur. This may result in an incorrect interference calculation.

Impaired SFBC orthogonality may also result from inter-cell interference. That is, each SFBC tone pair in the control channel may be separated by a pilot tone, and in cases where the tone spacing is large, the separation of the SFBC tone pairs may lead to interference from different channels. As a result, the orthogonality of the SFBC streams may be impaired, which may in turn reduce a signal-to-interference-plus-noise ratio (SINR) and may lead to an inaccurate interference covariance matrix calculation.

Thus, the control channel may be configured to enable robust inter-cell control channel interference cancelling capabilities and a reduced control channel error rate. Some control channel configurations may further enable a reduction in complexity associated with inter-cell control channel coordination by base stations. For example, control channel resource granularity may be configured to the RB level, and reference signal tones from different transmit antenna ports may be inserted in consecutive subcarriers.

In some cases, a control channel configuration may use an RB-level REG and consecutive reference signals (e.g., back-to-back reference signals) to prevent mixed pilot-on-control and control-on-control interference within an SFBC tone pair, which may enable improved interference covariance matrix calculation accuracy. Additionally, an RB-level REG and back-to-back reference signal control channel configuration may enable improved interference averaging due to a relatively coarse REG granularity, and may further enable improved base station control coordination. That is, interference coordination may be controlled more efficiently due to a relatively coarse REG granularity.

In some cases, for each SFBC pair, the two tones may not be separated by a pilot tone, which may enable improved interference covariance matrix accuracy. In some examples, such as with an REG-based interference covariance matrix, the coarse granularity of the REG may lead to improved interference averaging, with more SFBC pairs included in a single REG. In some cases, such as with a ½ pilot density, each REG may only interfere with either a whole REG from a neighboring cell, or the pilot from a neighboring cell.

Figure 3A:
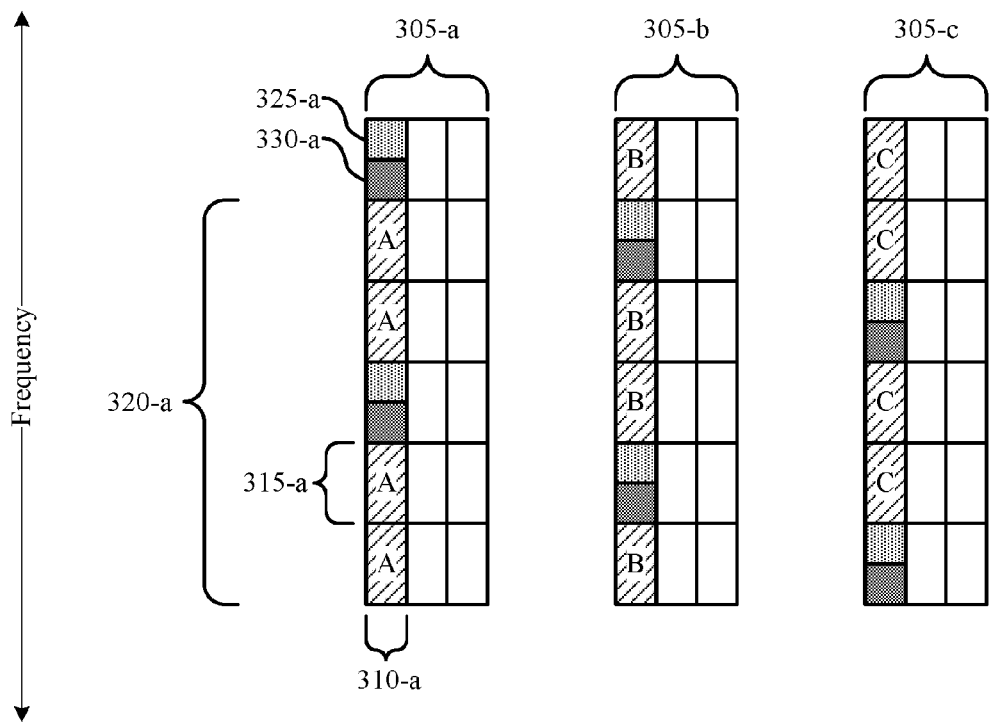
FIGS. 3A and 3B illustrate examples of control channel configurations in a system that support back-to-back reference signals, in accordance with one or more aspects of the present disclosure.
Figure 3B:
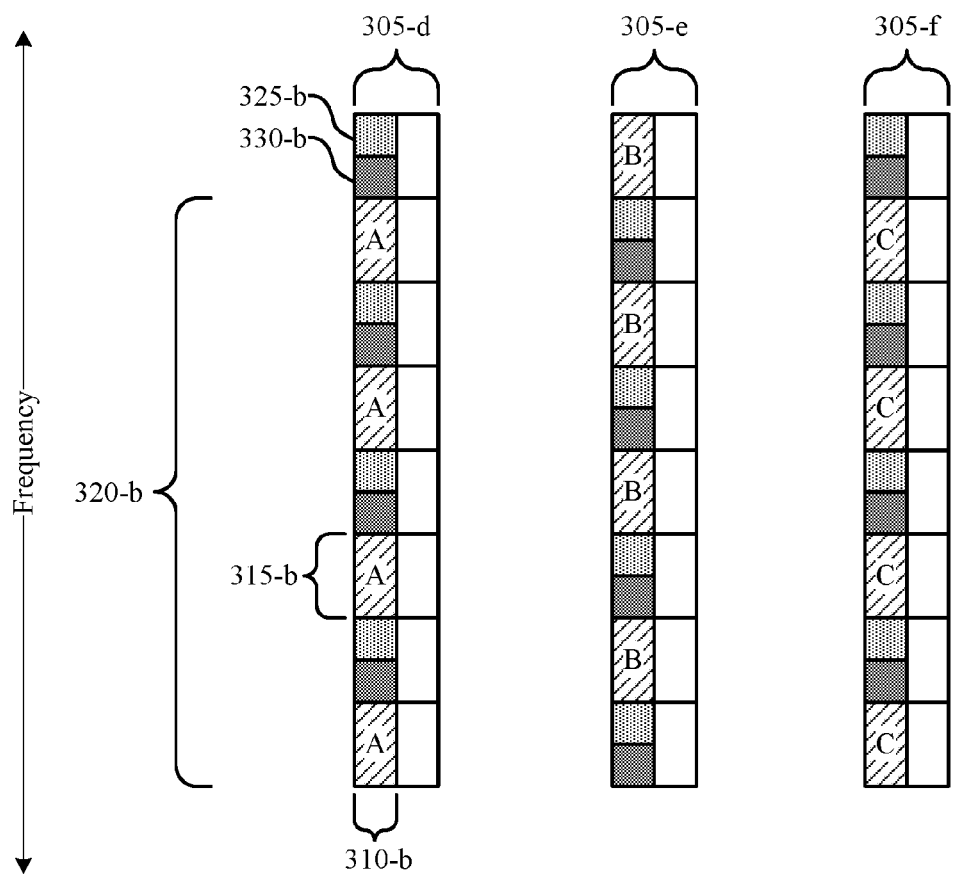

FIGS. 3A and 3B illustrate examples of control channel configurations 301 and 302 in a system that supports back-to-back reference signals, in accordance with one or more aspects of the present disclosure. In some cases, control channel configurations 301 and 302 may represent aspects of techniques performed by a UE 115 or base station 105 as described with reference to FIGS. 1-2. Control channel configuration 301 may be an example of a back-to-back reference signal transmission using a ⅓ pilot density, where the total resources used for pilot signals includes one third of the tones of an RB.

A base station 105 in communication with a UE 115 may transmit control messages in control region 305-a, which may span several symbol periods 310 (e.g., symbol period 310-a may be the first symbol period 310 of a TTI), and may include a number of RE pairs 315 that are grouped into an REG 320. Each RB of control region 305-a may also include resource elements designated for pilot transmissions (e.g., port 1 reference signal 325-a and port 2 reference signal 330-a) located in consecutive subcarriers (e.g., back-to-back reference signals), and RE pairs 315 may be interspersed with port 1 reference signals 325 and port 2 reference signals 330. REG 320-a is illustrated spanning the resources of one RB, but may also span multiple RBs.

A back-to-back reference signal configuration may prevent mixed pilot-on-control and control-on-control interference between base stations 105. For example, one or more neighboring base stations 105 may transmit reference signals and control messages in control region 305-b and/or control region 305-c that may interfere with transmissions in control region 305-a. However, control region 305-b and control region 305-c may also be configured to use an RB-level REG and back-to-back reference signals. As a result, a single RE pair 315, such as RE pair 315-a, may only encounter interference from either reference signals or control messages of respective control regions 305. That is, an RE pair 315 may not have partially overlapping interference from reference signals and control messages from a neighboring base station.

Control channel configuration 302 may represent a control message that is transmitted with a ½ pilot density, where the total pilot tones comprise one half of an RB. A base station 105 in communication with a UE 115 may transmit control information in control region 305-d spanning several symbol periods 310 of a TTI (including symbol period 310-b as a first symbol period 310 of the TTI).

Control region 305-d may include multiple RE pairs 315-b, which may be grouped into REG 320-b. REG 320-b may span at least one RB (e.g., for RB-level REG granularity) and may be interspersed with multiple pilot transmissions (e.g., port 1 reference signal 325-b and port 2 reference signal 330-b). Pilot transmissions of port 1 reference signal 325 and port 2 reference signal 330 may be included in one out of every two REs of the RB, and may be grouped into contiguous reference signal pairs.

In some examples, based the ½ pilot density illustrated in control channel configuration 302, each RE pair 315 may only interfere with either another RE pair or another reference signal from respective control regions transmitted by neighboring base stations 105 (e.g., from control region 305-e and/or control region 305-f).

Figure 4:
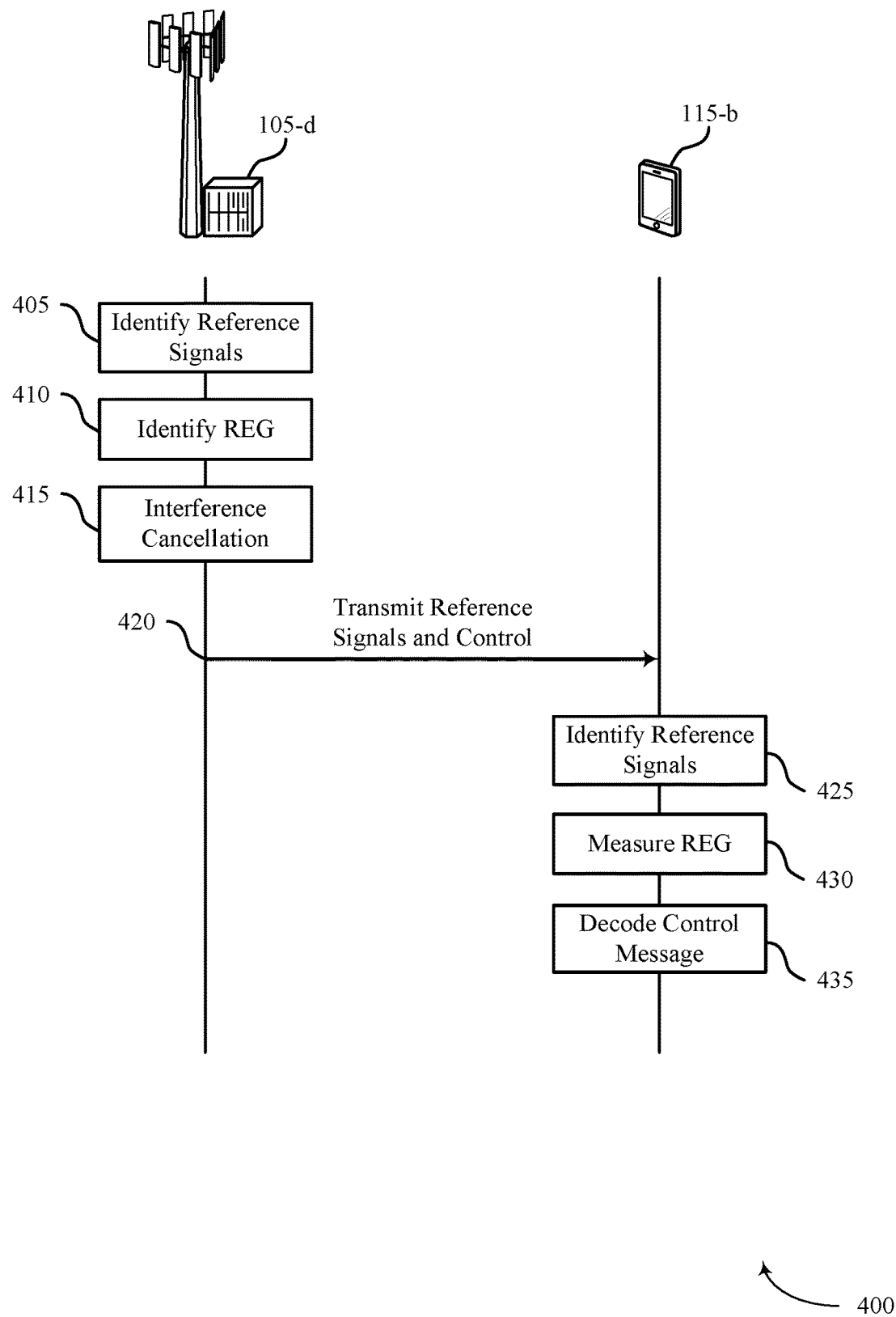
FIG. 4 illustrates an example of a process flow in a system that supports back-to-back reference signals, in accordance with one or more aspects of the present disclosure.

FIG. 4 illustrates an example of a process flow 400 in a system that supports back-to-back reference signals, in accordance with one or more aspects of the present disclosure. Process flow 400 may include base station 105-a and UE 115-a, which may be examples of the corresponding devices described with reference to FIG. 1-2.

At 405, base station 105-d may identify a first set of one or more reference signal REs and a second set of one or more reference signal REs in a symbol period, where each reference signal RE of the first set is contiguous to a reference signal RE of the second set. In some examples, a combination of the first set of one or more reference signal REs and the second set of one or more reference signal REs comprise one half or one third of the frequency tones of an RB. In some cases, the symbol period includes a first symbol period of a TTI.

At 410, base station 105-d may identify an REG including multiple REs in the symbol period, where one or more REs of the REG is contiguous to a reference signal RE of the first set or a reference signal RE of the second set. In some examples, the first set of one or more reference signal REs, the second set of one or more reference signal REs, and the REG comprise one or more RBs of frequency tones.

At 415, base station 105-d may perform interference cancellation for one or more REGs of the set of REGs. For example, base station 105-d may calculate an interference covariance matrix for each of the one or more REGs, and perform the interference cancellation based on the interference covariance matrix. In some cases, base station 105-d may determine that a neighboring base station 105 uses a reference signal configuration based on contiguous reference signal REs, and perform interference cancellation based on the neighboring base station's reference signal configuration. In some examples, base station 105-d may coordinate an REG pattern with a neighboring base station 105 or a core network entity, where the REG pattern prevents partially overlapping REGs from different base stations 105, and interference cancellation may be performed based on the REG pattern. In some cases, the coordinated REG pattern may minimize a probability that two base stations use an overlapping REG.

At 420, base station 105-d may transmit the first reference signal using the first set of one or more reference signal REs, the second reference signal using the second set of one or more reference signal REs, and a control message using the set of REGs including the REG. In some examples, the first reference signal is associated with a first antenna port and the second reference signal is associated with a second antenna port. In some cases, the control message is transmitted using an SFBC, and the SFBC is based on distributing a set of symbols of the control message to a set of RE pairs of the SFBC. In some cases, REs of each RE pair of the set of RE pairs are contiguous.

At 425, UE 115-b may identify the first set of one or more reference signal REs and the second set of one or more reference signal REs, where each reference signal RE of the first set is contiguous to the reference signal RE of the second set. UE 115-b may then identify the REG including multiple REs in the symbol period, where one or more REs of the REG are contiguous to a reference signal RE of the first set or a reference signal RE of the second set. UE 115-b may measure the REG at 430, and decode the control message at 435.

Figure 5:
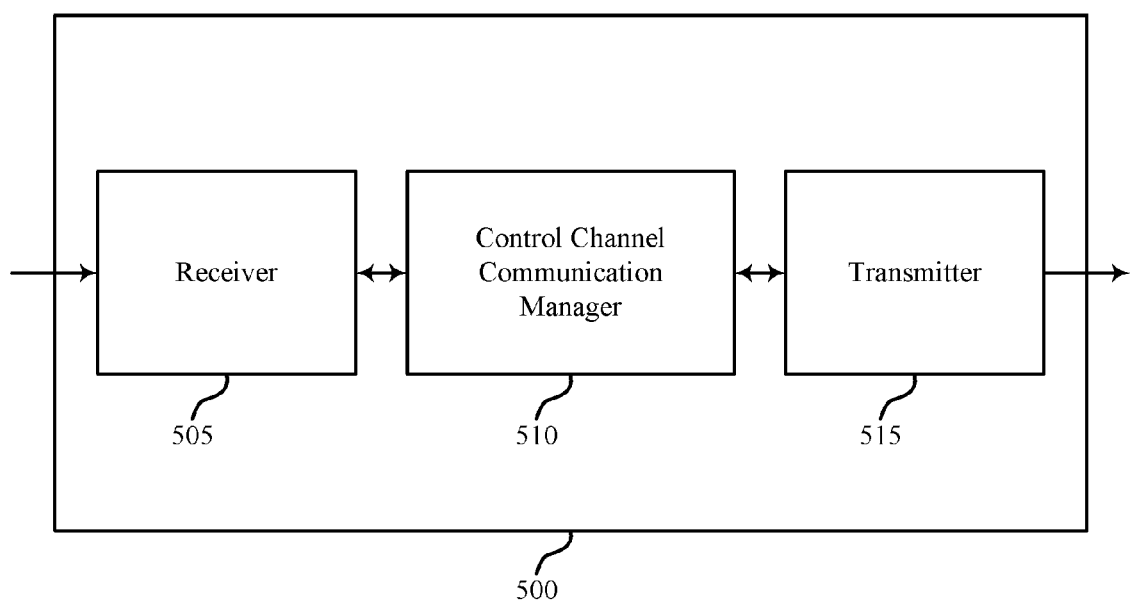
FIGS. 5 through 7 show block diagrams of a wireless device that supports back-to-back reference signals, in accordance with one or more aspects of the present disclosure.

FIG. 5 shows a block diagram of a wireless device 500 that supports back-to-back reference signals, in accordance with one or more aspects of the present disclosure. Wireless device 500 may be an example of aspects of a UE 115 or base station 105 described with reference to FIGS. 1 and 2. Wireless device 500 may include receiver 505, control channel communication manager 510, and transmitter 515. Wireless device 500 may also include a processor. Each of these components may be in communication with each other.

The receiver 505 may receive information such as packets, user data, or control information associated with various information channels (e.g., control channels, data channels, and information related to back-to-back reference signals, etc.). Information may be passed on to other components of the device. The receiver 505 may be an example of aspects of the transceiver 825 or 925 described with reference to FIGS. 8 and 9.

The control channel communication manager 510 may identify a first set of one or more reference signal REs and a second set of one or more reference signal REs in a symbol period, where each reference signal RE of the first set is contiguous to a reference signal RE of the second set, and identify an REG including a set of REs in the symbol period, where one or more REs of the REG is contiguous to a reference signal RE of the first set or a reference signal RE of the second set. The control channel communication manager 510 may also be an example of aspects of the UE control channel communication manager 805 or base station control channel communication manager 905 described with reference to FIGS. 8 and 9.

The transmitter 515 may transmit signals received from other components of wireless device 500. In some examples, the transmitter 515 may be collocated with a receiver in a transceiver module. For example, the transmitter 515 may be an example of aspects of the transceiver 825 or transceiver 925 described with reference to FIGS. 8 and 9. The transmitter 515 may include a single antenna, or it may include a plurality of antennas.

Figure 6:
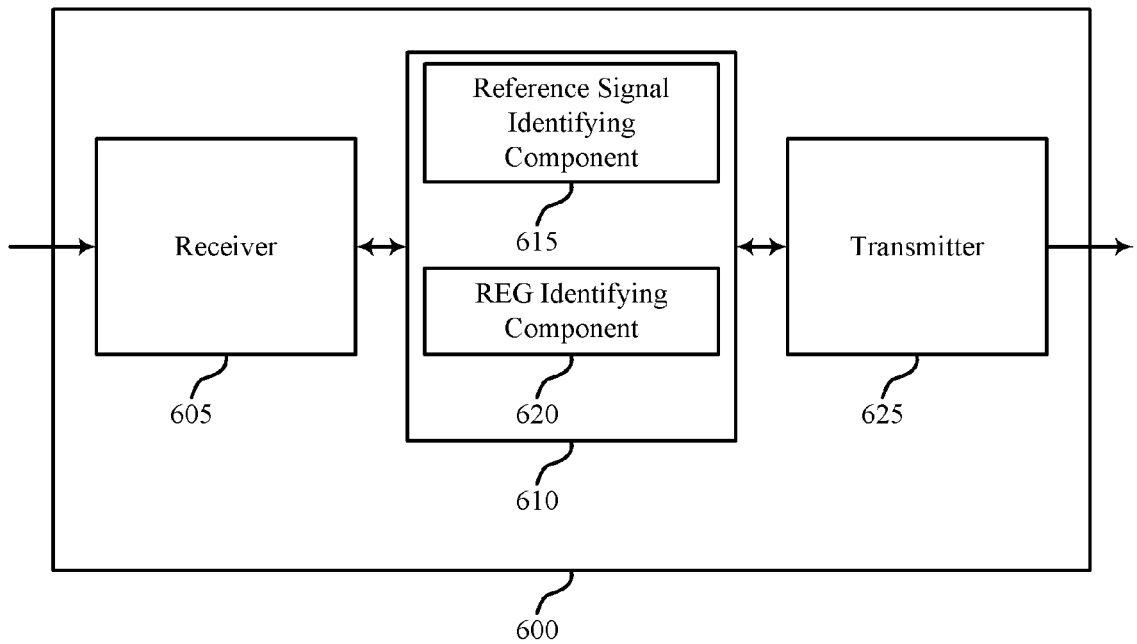

FIG. 6 shows a block diagram of a wireless device 600 that supports back-to-back reference signals, in accordance with one or more aspects of the present disclosure. Wireless device 600 may be an example of aspects of a wireless device 500, a UE 115, or base station 105 described with reference to FIGS. 1, 2, and 5. Wireless device 600 may include receiver 605, control channel communication manager 610, and transmitter 625. Wireless device 600 may also include a processor. Each of these components may be in communication with each other.

The receiver 605 may receive information which may be passed on to other components of the device. The receiver 605 may also perform the functions described with reference to the receiver 505 described with reference to FIG. 5. The receiver 605 may be an example of aspects of the transceiver 825 or transceiver 925 described with reference to FIGS. 8 and 9.

The control channel communication manager 610 may be an example of aspects of control channel communication manager 510 described with reference to FIG. 5. The control channel communication manager 610 may include reference signal identifying component 615 and REG identifying component 620. The control channel communication manager 610 may be an example of aspects of the UE control channel communication manager 805 or base station control channel communication manager 905 described with reference to FIGS. 8 and 9.

The reference signal identifying component 615 may identify a first set of one or more reference signal REs and a second set of one or more reference signal REs in a symbol period, where each reference signal RE of the first set is contiguous to a reference signal RE of the second set. In some cases, the first set of one or more reference signal REs, the second set of one or more reference signal REs, and the REG include one or more RBs of frequency tones. In some cases, the first set of one or more reference signal REs and the second set of one or more reference signal REs combined include one half of the frequency tones of an RB. In some cases, the first set of one or more reference signal REs and the second set of one or more reference signal REs combined include one third of the frequency tones of an RB. In some cases, the symbol period includes a first symbol period of a TTI. The REG identifying component 620 may identify an REG including a set of REs in the symbol period, where one or more REs of the REG is contiguous to a reference signal RE of the first set of reference signal REs or a reference signal RE of the second set of reference signal REs.

The transmitter 625 may transmit signals received from other components of wireless device 600. In some examples, the transmitter 625 may be collocated with a receiver in a transceiver module. For example, the transmitter 625 may be an example of aspects of the transceiver 825 or transceiver 925 described with reference to FIGS. 8 and 9. The transmitter 625 may utilize a single antenna, or it may utilize a plurality of antennas.

Figure 7:
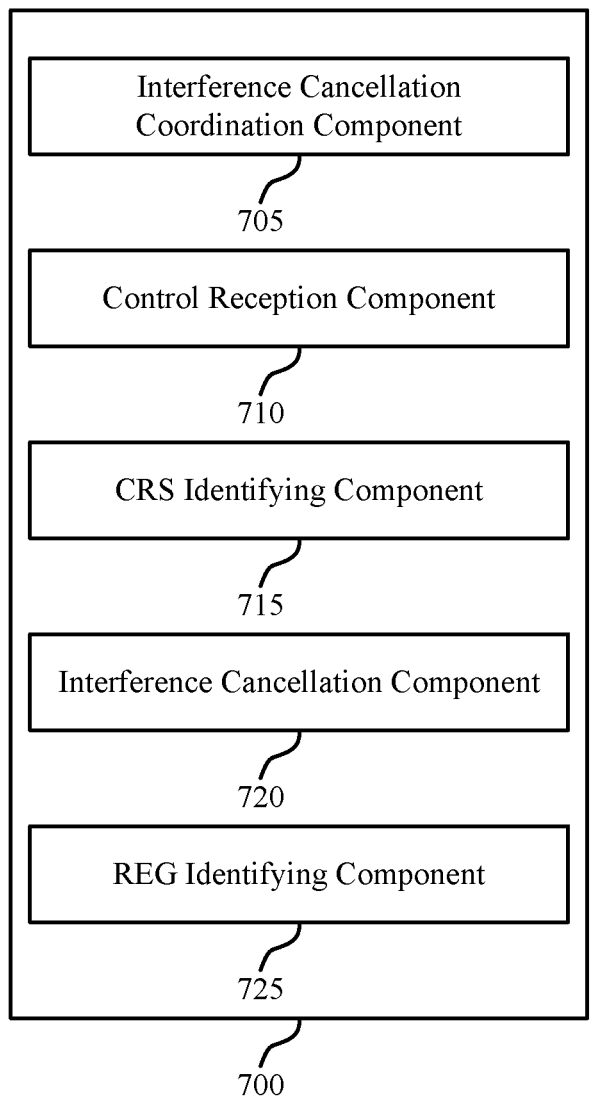

FIG. 7 shows a block diagram of a control channel communication manager 700 that supports back-to-back reference signals, in accordance with one or more aspects of the present disclosure. Control channel communication manager 700 may be an example of the corresponding component of wireless device 500 or wireless device 600. That is, control channel communication manager 700 may be an example of aspects of control channel communication manager 510 or control channel communication manager 610 described with reference to FIGS. 5 and 6. The control channel communication manager 700 may also be an example of aspects of the UE control channel communication manager 805 or base station control channel communication manager 905 described with reference to FIGS. 8 and 9.

The control channel communication manager 700 may include interference cancellation coordination component 705, control reception component 710, reference signal identifying component 715, interference cancellation component 720, and REG identifying component 725. Each of these modules may communicate, directly or indirectly, with one another (e.g., via one or more buses).

The interference cancellation coordination component 705 may determine that a neighboring base station uses a reference signal configuration based on contiguous reference signal REs; coordinate an REG pattern with the neighboring base station or a core network entity, where the REG pattern prevents partially overlapping REGs from different base stations; and coordinate an REG pattern with the neighboring base station or a core network entity, where the REG pattern minimizes a probability that two base stations use an overlapping REG, and where interference cancellation is performed based on the REG pattern. Additionally or alternatively, performing interference cancellation is based on the determination.

The control reception component 710 may receive a first reference signal using the first set of reference signal REs, a second reference signal using the second set of reference signal REs, and a control message using a set of REGs including the REG. In some cases, the control reception component 710 may transmit a first reference signal using the first set of one or more reference signal REs, a second reference signal using the second set of one or more reference signal REs, and a control message using a set of REGs including the REG. In some cases, the first reference signal is associated with a first antenna port and the second reference signal is associated with a second antenna port. In some cases, the control message is transmitted using an SFBC, and the SFBC may be based on distributing a set of symbols of the control message to a set of RE pairs of the SFBC. In some cases, each RE pair of the SFBC is separated by a reference signal RE of the first set of reference signal REs or the second set of reference signal REs. In some cases, the REs of each RE pair of the set of RE pairs are contiguous.

The reference signal identifying component 715 may identify a first set of one or more reference signal REs and a second set of one or more reference signal REs in a symbol period, where each reference signal RE of the first set is contiguous to a reference signal RE of the second set. In some cases, the first set of one or more reference signal REs, the second set of one or more reference signal REs, and the REG include one or more RBs of frequency tones. In some cases, the first set of one or more reference signal REs and the second set of one or more reference signal REs combined include one half of the frequency tones of an RB. In some cases, the first set of one or more reference signal REs and the second set of one or more reference signal REs combined include one third of the frequency tones of an RB. In some cases, the symbol period includes a first symbol period of a TTI.

The interference cancellation component 720 may calculate an interference covariance matrix for each of the one or more REGs and perform interference cancellation for one or more REGs of the set of REGs, where the interference cancellation is performed based on the interference covariance matrix. The REG identifying component 725 may identify an REG including a set of REs in the symbol period, where one or more REs of the REG is contiguous to a reference signal RE of the first set or a reference signal RE of the second set.

Figure 8:
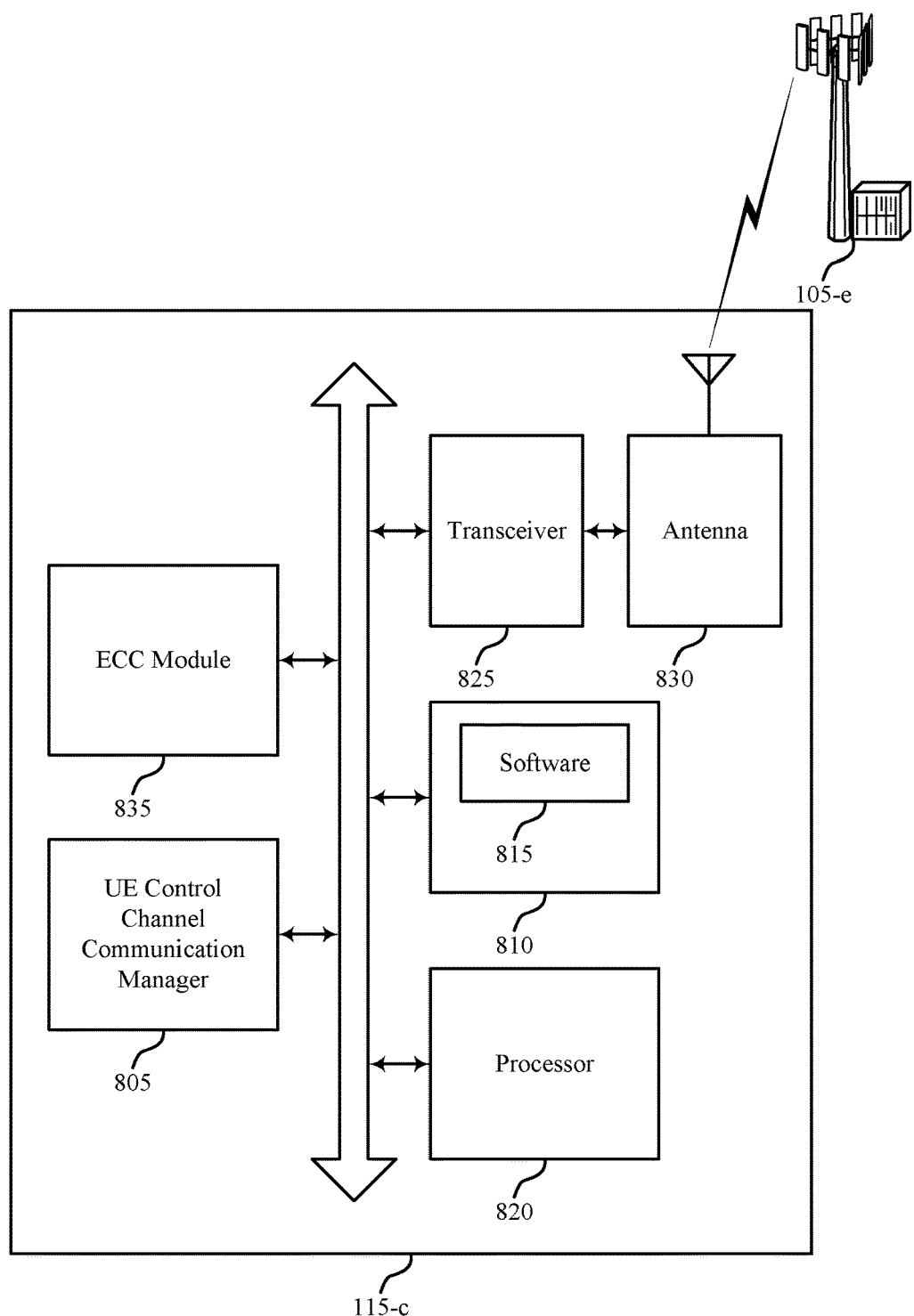
FIG. 8 illustrates a block diagram of a system including a UE that supports back-to-back reference signals, in accordance with one or more aspects of the present disclosure.

FIG. 8 shows a diagram of a system 800 including a device that supports back-to-back reference signals, in accordance with one or more aspects of the present disclosure. For example, system 800 may include UE 115-c, which may be an example of a wireless device 500, a wireless device 600, or a UE 115 as described with reference to FIGS. 1, 2, and 5 through 7.

UE 115-c may also include UE control channel communication manager 805, memory 810, processor 820, transceiver 825, antenna 830, and ECC module 835. Each of these modules may communicate, directly or indirectly, with one another (e.g., via one or more buses). The UE control channel communication manager 805 may be an example of a control channel communication manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., back-to-back reference signals, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.).

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions. The ECC module 835 may enable operations using eCCs, such as communication using shared or unlicensed spectrum, using reduced TTIs or subframe durations, or using a large number of CCs.

Figure 9:
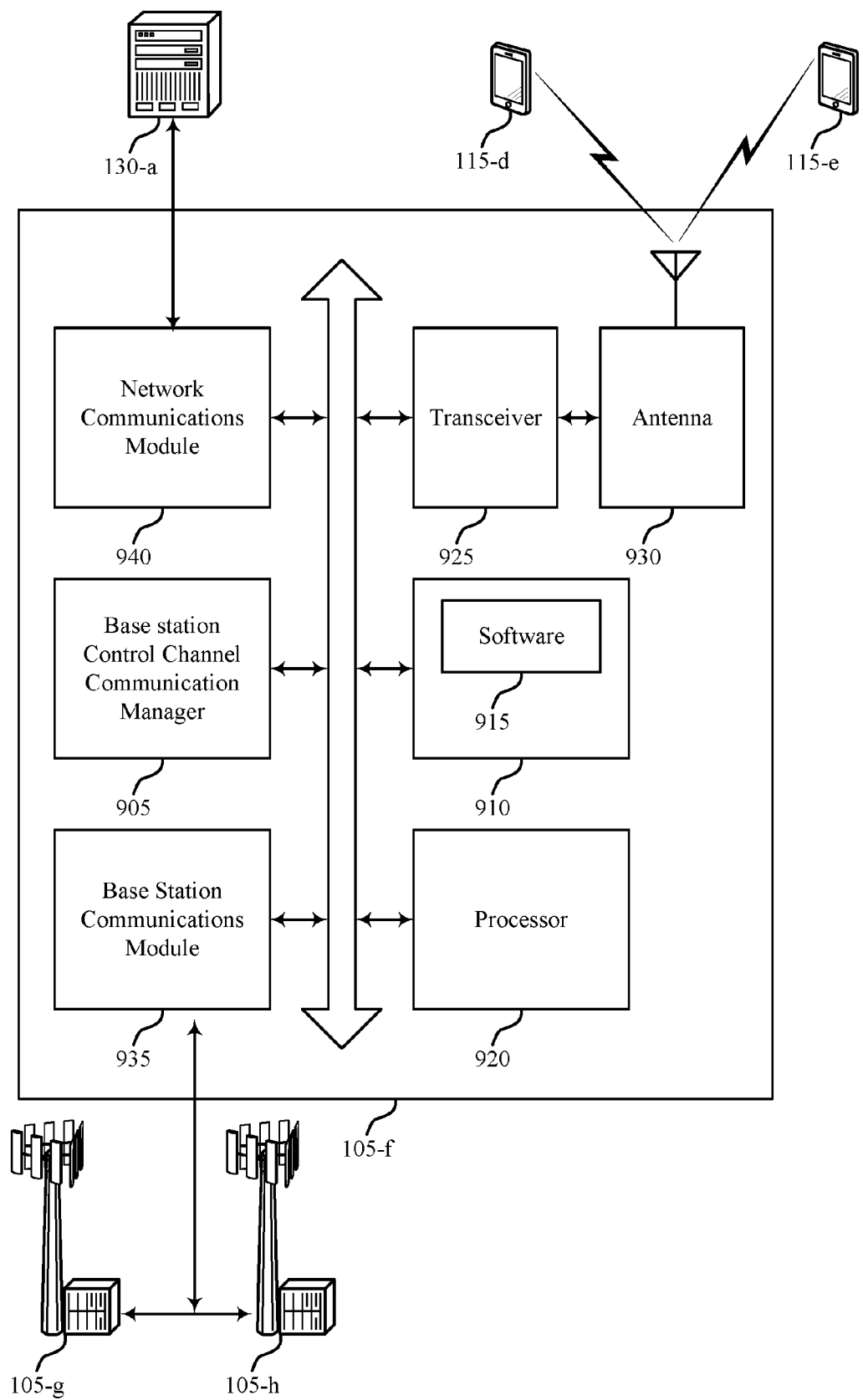
FIG. 9 illustrates a block diagram of a system including a base station that supports back-to-back reference signals, in accordance with one or more aspects of the present disclosure.

FIG. 9 shows a diagram of a wireless system 900 including a device that supports back-to-back reference signals, in accordance with one or more aspects of the present disclosure. For example, system 900 may include base station 105-f, which may be an example of a wireless device 500, a wireless device 600, or a base station 105 as described with reference to FIGS. 1, 2 and 5 through 7. Base station 105-f may also include components for bi-directional voice and data communications including components for transmitting communications and components for receiving communications. For example, base station 105-*f* may communicate bi-directionally with one or more UEs 115.

Base station 105-*f* may also include base station control channel communication manager 905, memory 910, processor 920, transceiver 925, antenna 930, base station communications module 935, and network communications module 940. Each of these modules may communicate, directly or indirectly, with one another (e.g., via one or more buses). The base station control channel communication manager 905 may be an example of a control channel communication manager as described with reference to FIGS. 5 through 7.

The memory 910 may include RAM and ROM. The memory 910 may store computer-readable, computer-executable software including instructions that, when executed, cause the processor to perform various functions described herein (e.g., back-to-back reference signals, etc.). In some cases, the software 915 may not be directly executable by the processor but may cause a computer (e.g., when compiled and executed) to perform functions described herein. The processor 920 may include an intelligent hardware device, (e.g., a CPU, a microcontroller, an ASIC, etc.).

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 830, which may be capable of concurrently transmitting or receiving multiple wireless transmissions.

The base station communications module 935 may manage communications with other base stations 105, and may include a controller or scheduler for controlling communications with UEs 115 in cooperation with other base stations 105. For example, the base station communications module 935 may coordinate scheduling for transmissions to UEs 115 for various interference mitigation techniques such as beamforming or joint transmission. In some examples, base station communications module 935 may provide an X2 interface within an LTE/LTE-A wireless communication network technology to provide communication between base stations 105. The network communications module 940 may manage communications with the core network (e.g., via one or more wired backhaul links). For example, the network communications module 940 may manage the transfer of data communications for client devices, such as one or more UEs 115.

Figure 10:
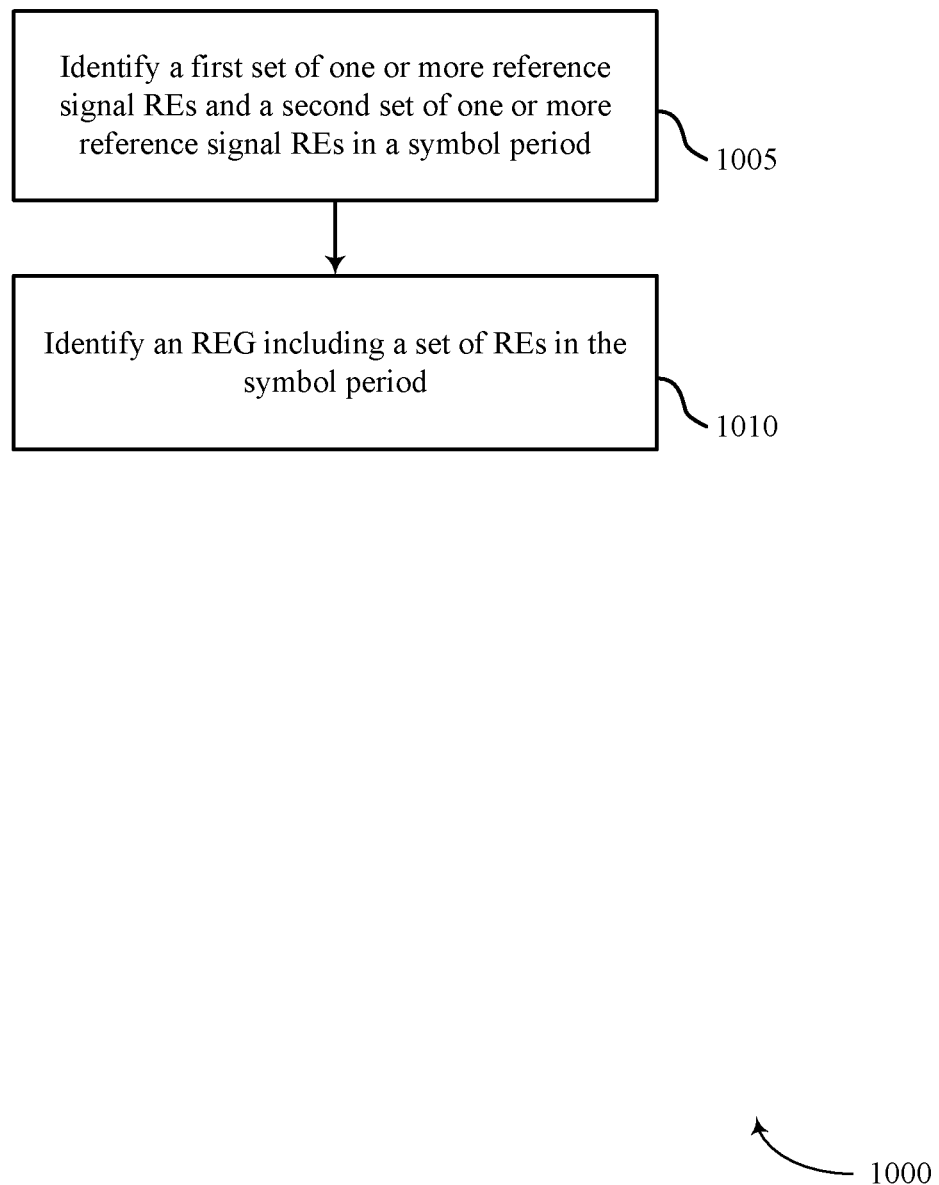
FIGS. 10 through 14 illustrate methods for back-to-back reference signals, in accordance with one or more aspects of the present disclosure.

FIG. 10 shows a flowchart illustrating a method 1000 for back-to-back reference signals, in accordance with one or more aspects of the present disclosure. The operations of method 1000 may be implemented by a device, such as a UE 115 or base station 105, or its components as described with reference to FIGS. 1 and 2. For example, the operations of method 1000 may be performed by the control channel communication manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

Figure 3B:
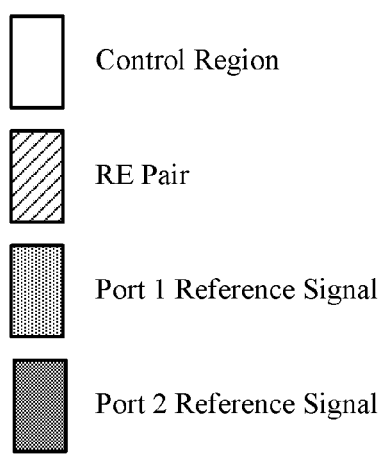

At block 1005, the UE 115 or base station 105 may identify a first set of one or more reference signal REs and a second set of one or more reference signal REs in a symbol period. In some cases, each reference signal RE of the first set may be contiguous to a reference signal RE of the second set as described above with reference to FIGS. 2 through 4. In certain examples, the operations of block 1005 may be performed by the reference signal identifying component as described with reference to FIGS. 6 and 7.

At block 1010, the UE 115 or base station 105 may identify an REG including a set of REs in the symbol period. In some cases, one or more REs of the REG may be contiguous to a reference signal RE of the first set or a reference signal RE of the second set as described above with reference to FIGS. 2 through 4. In certain examples, the operations of block 1010 may be performed by the REG identifying component as described with reference to FIGS. 6 and 7.

Figure 11:
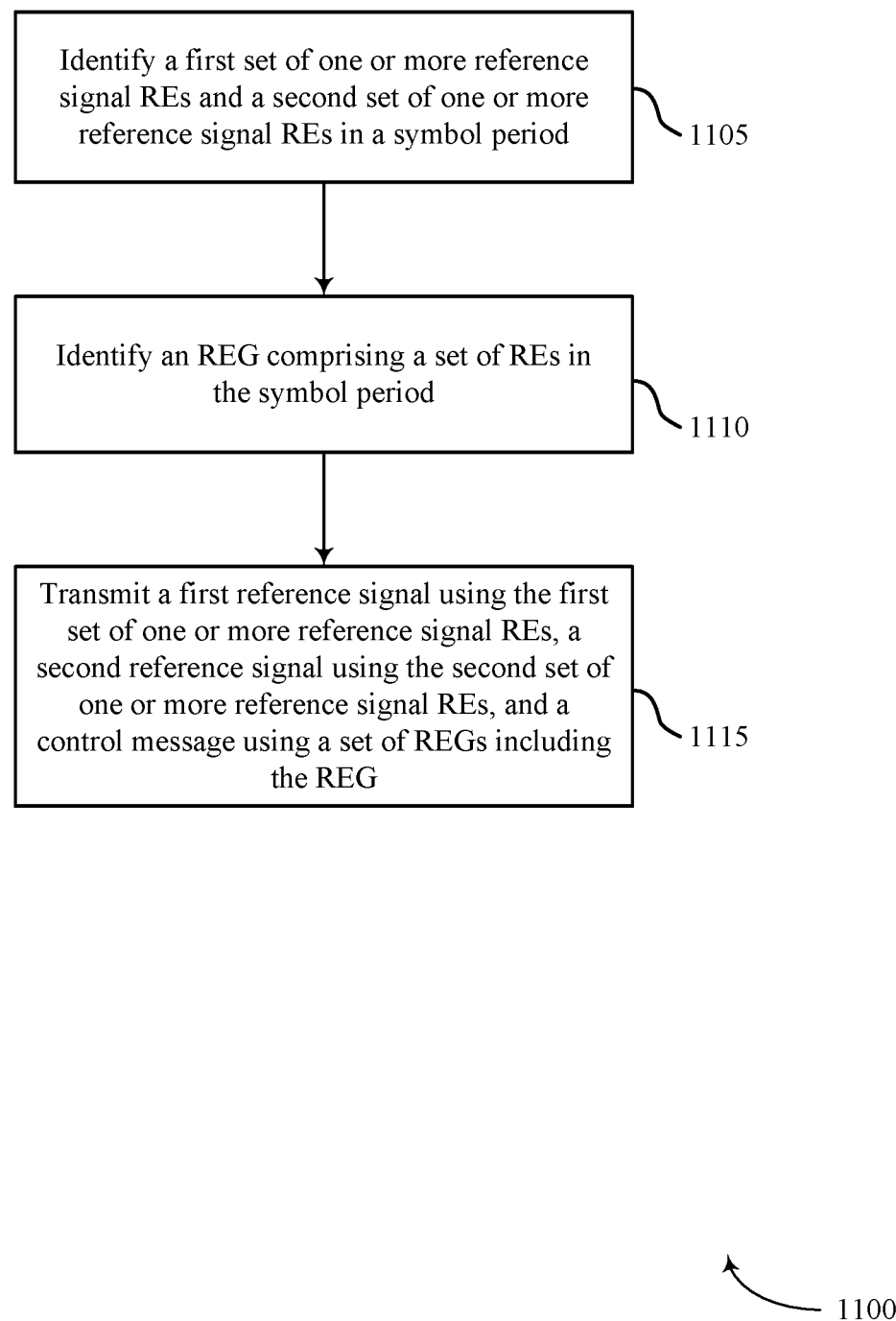

FIG. 11 shows a flowchart illustrating a method 1100 for back-to-back reference signals, in accordance with one or more aspects of the present disclosure. The operations of method 1100 may be implemented by a device, such as a UE 115 or base station 105, or its components as described with reference to FIGS. 1 and 2. For example, the operations of method 1100 may be performed by the control channel communication manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1105, the UE 115 or base station 105 may identify a first set of one or more reference signal REs and a second set of one or more reference signal REs in a symbol period. In some examples, each reference signal RE of the first set may be contiguous to a reference signal RE of the second set as described above with reference to FIGS. 2 through 4. In certain examples, the operations of block 1105 may be performed by the reference signal identifying component as described with reference to FIGS. 6 and 7.

At block 1110, the UE 115 or base station 105 may identify an REG including a set of REs in the symbol period. In some cases, one or more REs of the REG may be contiguous to a reference signal RE of the first set or a reference signal RE of the second set as described above with reference to FIGS. 2 through 4. In certain examples, the operations of block 1110 may be performed by the REG identifying component as described with reference to FIGS. 6 and 7.

At block 1115, the UE 115 or base station 105 may transmit a first reference signal using the first set of one or more reference signal REs, a second reference signal using the second set of one or more reference signal REs and a control message using a set of REGs including the REG as described above with reference to FIGS. 2 through 4. In certain examples, the operations of block 1115 may be performed by the control reception component as described with reference to FIGS. 6 and 7.

Figure 12:
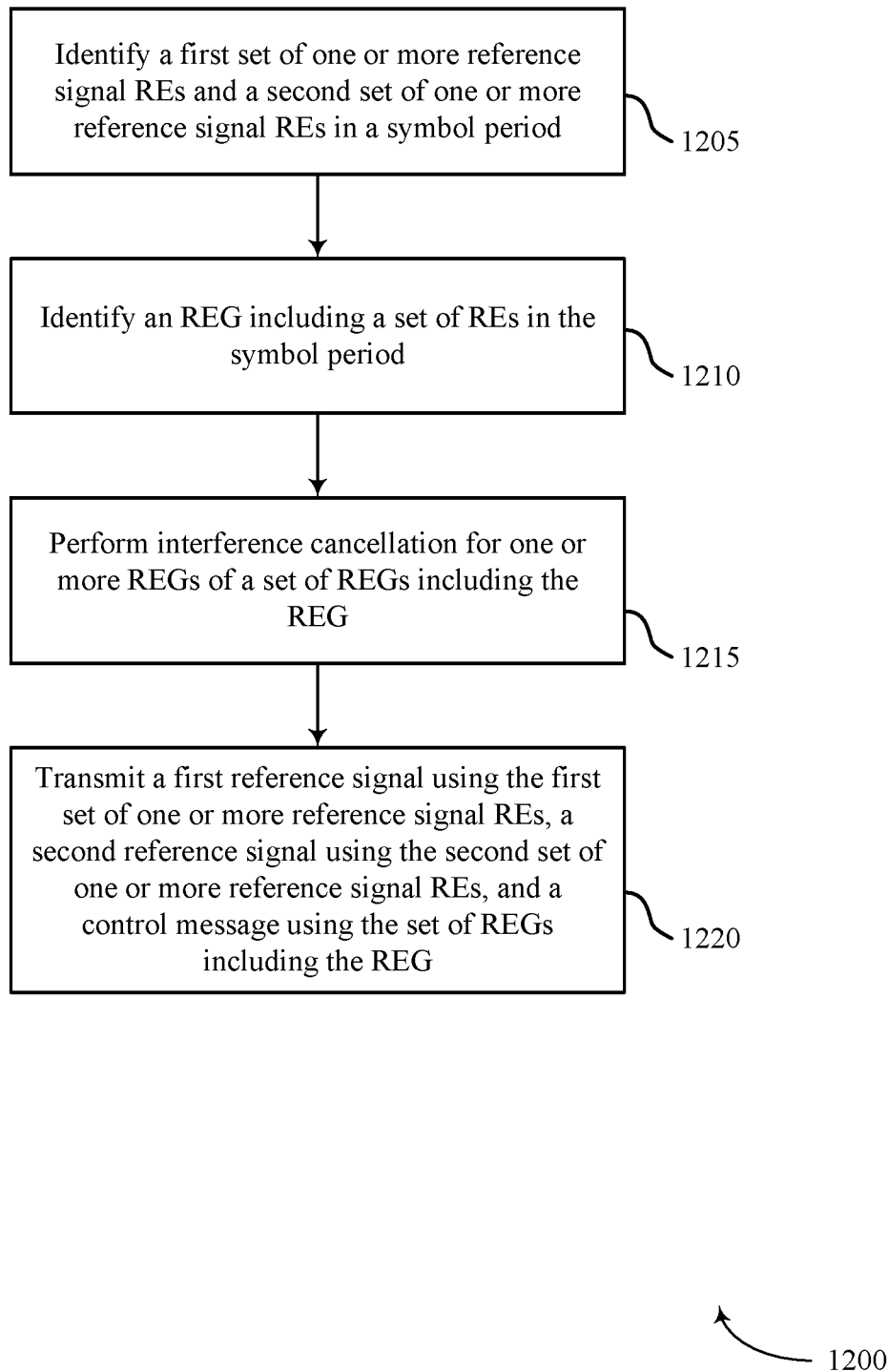

FIG. 12 shows a flowchart illustrating a method 1200 for back-to-back reference signals, in accordance with one or more aspects of the present disclosure. The operations of method 1200 may be implemented by a device such as a UE 115 or base station 105 or its components as described with reference to FIGS. 1 and 2. For example, the operations of method 1200 may be performed by the control channel communication manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1205, the UE 115 or base station 105 may identify a first set of one or more reference signal REs and a second set of one or more reference signal REs in a symbol period. In some cases, each reference signal RE of the first set may be contiguous to a reference signal RE of the second set as described above with reference to FIGS. 2 through 4. In certain examples, the operations of block 1205 may be performed by the reference signal identifying component as described with reference to FIGS. 6 and 7.

At block 1210, the UE 115 or base station 105 may identify an REG including a set of REs in the symbol period. In some examples, one or more REs of the REG is contiguous to a reference signal RE of the first set or a reference signal RE of the second set as described above with reference to FIGS. 2 through 4. In certain examples, the operations of block 1210 may be performed by the REG identifying component as described with reference to FIGS. 6 and 7.

At block 1215, the UE 115 or base station 105 may perform interference cancellation for one or more REGs of a set of REGs including the REG as described above with reference to FIGS. 2 through 4. In certain examples, the operations of block 1215 may be performed by the interference cancellation component as described with reference to FIGS. 6 and 7.

At block 1220, the UE 115 or base station 105 may transmit a first reference signal using the first set of one or more reference signal REs, a second reference signal using the second set of one or more reference signal REs and a control message using the set of REGs including the REG as described above with reference to FIGS. 2 through 4. In certain examples, the operations of block 1220 may be performed by the control reception component as described with reference to FIGS. 6 and 7.

Figure 13:
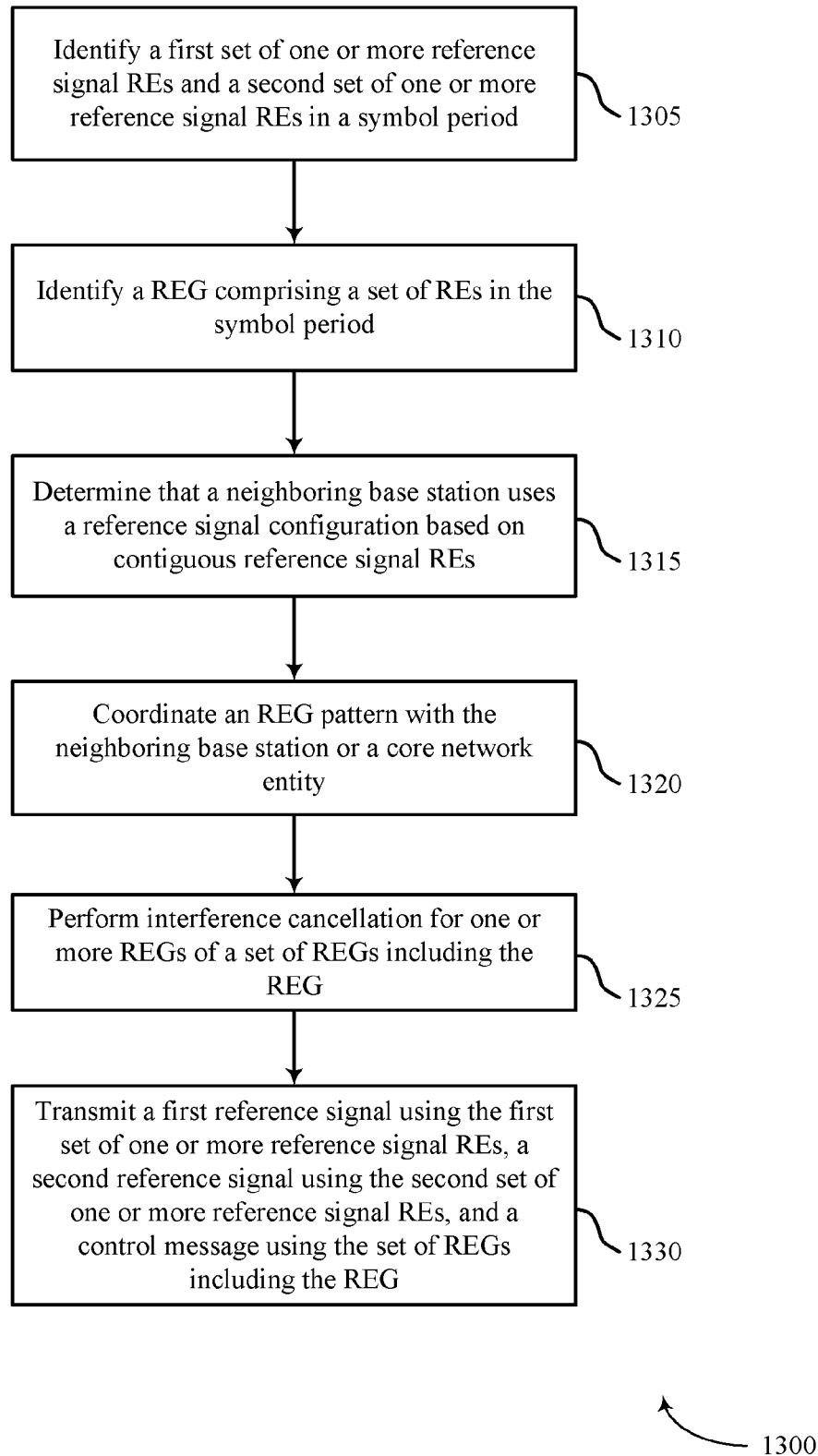

FIG. 13 shows a flowchart illustrating a method 1300 for back-to-back reference signals, in accordance with one or more aspects of the present disclosure. The operations of method 1300 may be implemented by a device such as a UE 115 or base station 105 or its components as described with reference to FIGS. 1 and 2. For example, the operations of method 1300 may be performed by the control channel communication manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1305, the UE 115 or base station 105 may identify a first set of one or more reference signal REs and a second set of one or more reference signal REs in a symbol period. In some cases, each reference signal RE of the first set may be contiguous to a reference signal RE of the second set as described above with reference to FIGS. 2 through 4. In certain examples, the operations of block 1305 may be performed by the reference signal identifying component as described with reference to FIGS. 6 and 7.

At block 1310, the UE 115 or base station 105 may identify an REG including a set of REs in the symbol period. In some examples, one or more REs of the REG is contiguous to a reference signal RE of the first set or a reference signal RE of the second set as described above with reference to FIGS. 2 through 4. In certain examples, the operations of block 1310 may be performed by the REG identifying component as described with reference to FIGS. 6 and 7.

At block 1315, the UE 115 or base station 105 may determine that a neighboring base station uses a reference signal configuration based on contiguous reference signal REs as described above with reference to FIGS. 2 through 4. In certain examples, the operations of block 1315 may be performed by the interference cancellation coordination component as described with reference to FIGS. 6 and 7.

At block 1320, the UE 115 or base station 105 may coordinate an REG pattern with the neighboring base station or a core network entity, where the REG pattern prevents partially overlapping REGs from different base stations as described above with reference to FIGS. 2 through 4. In certain examples, the operations of block 1320 may be performed by the interference cancellation coordination component as described with reference to FIGS. 6 and 7.

At block 1325, the UE 115 or base station 105 may perform interference cancellation for one or more REGs of a set of REGs including the REG as described above with reference to FIGS. 2 through 4. In some examples, performing the interference cancellation may be based on the determination. Additionally or alternatively, the interference cancellation may be performed based on the REG pattern. In certain examples, the operations of block 1325 may be performed by the interference cancellation component as described with reference to FIGS. 6 and 7.

At block 1330, the UE 115 or base station 105 may transmit a first reference signal using the first set of one or more reference signal REs, a second reference signal using the second set of one or more reference signal REs and a control message using a set of REGs including the REG as described above with reference to FIGS. 2 through 4. In certain examples, the operations of block 1330 may be performed by the control reception component as described with reference to FIGS. 6 and 7.

Figure 14:
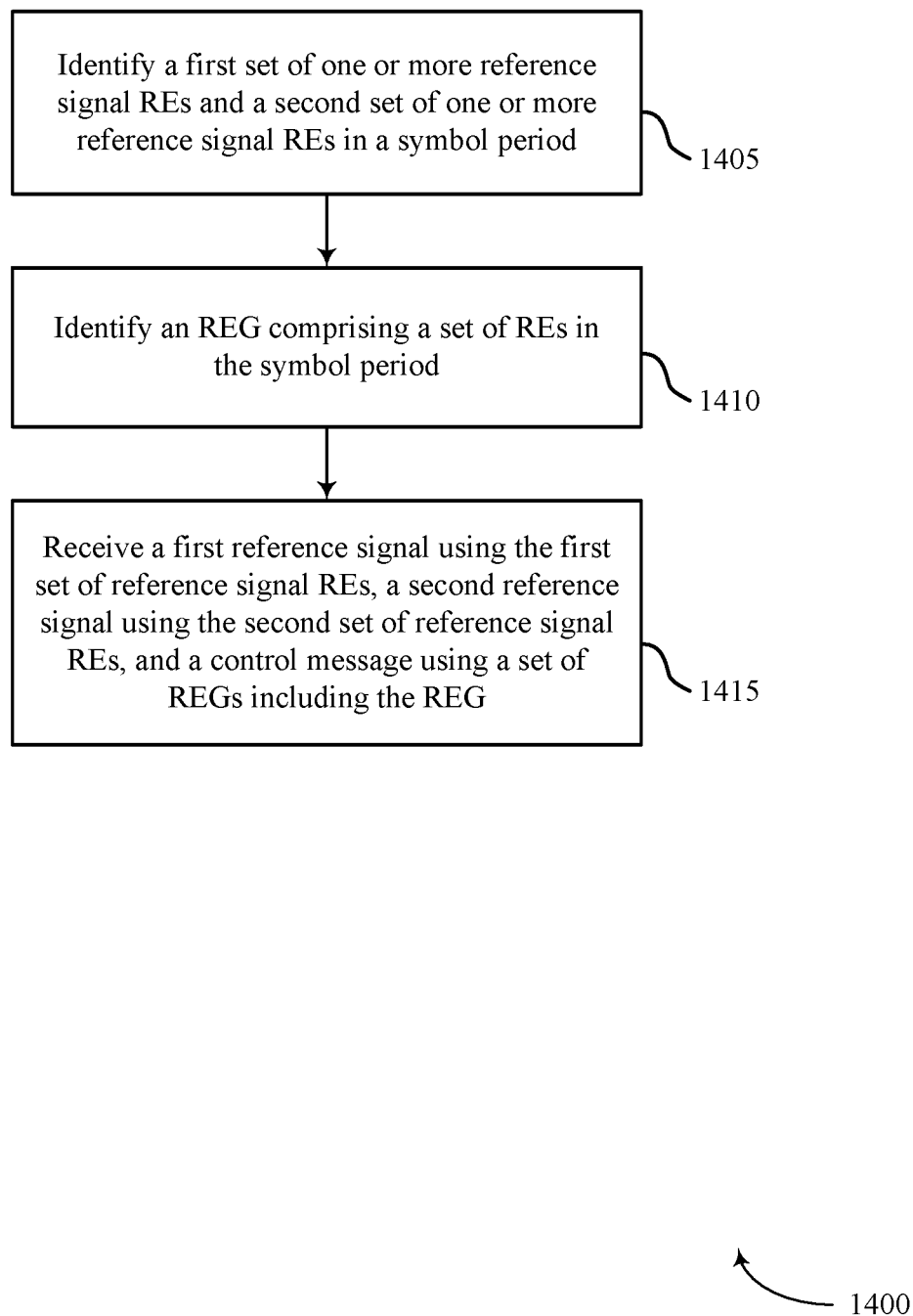

FIG. 14 shows a flowchart illustrating a method 1400 for back-to-back reference signals, in accordance with one or more aspects of the present disclosure. The operations of method 1400 may be implemented by a device such as a UE 115 or base station 105 or its components as described with reference to FIGS. 1 and 2. For example, the operations of method 1400 may be performed by the control channel communication manager as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 1405, the UE 115 or base station 105 may identify a first set of one or more reference signal REs and a second set of one or more reference signal REs in a symbol period. In some examples, each reference signal RE of the first set may be contiguous to a reference signal RE of the second set as described above with reference to FIGS. 2 through 4. In certain examples, the operations of block 1405 may be performed by the reference signal identifying component as described with reference to FIGS. 6 and 7.

At block 1410, the UE 115 or base station 105 may identify an REG including a set of REs in the symbol period. In some cases, one or more REs of the REG may be contiguous to a reference signal RE of the first set or a reference signal RE of the second set as described above with reference to FIGS. 2 through 4. In certain examples, the operations of block 1410 may be performed by the REG identifying component as described with reference to FIGS. 6 and 7.

At block 1415, the UE 115 or base station 105 may receive a first reference signal using the first set of reference signal REs, a second reference signal using the second set of reference signal REs, and a control message using a set of REGs including the REG as described above with reference to FIGS. 2 through 4. In certain examples, the operations of block 1415 may be performed by the control reception component as described with reference to FIGS. 6 and 7.

It should be noted that these methods describe possible implementation, and that the operations and the operations may be rearranged or otherwise modified such that other implementations are possible. In some examples, aspects from two or more of the methods may be combined. For example, aspects of each of the methods may include operations or aspects of the other methods, or other operations or techniques described herein. Thus, aspects of the disclosure may provide for back-to-back reference signals.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-A are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for back-to-back reference signals. It should be noted that these methods describe possible implementations, and that the operations and the operations may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
identifying a first set of one or more reference signal resource elements (REs) in a symbol period;
identifying a second set of one or more reference signal REs in the symbol period, wherein each reference signal RE of the first set of one or more reference signal REs is contiguous in frequency to a reference signal RE of the second set of one or more reference signal REs;
identifying a resource element group (REG) comprising a plurality of REs in the symbol period, wherein one or more REs of the REG is contiguous in frequency to a reference signal RE of the first set of one or more reference signal REs or a reference signal RE of the second set of one or more reference signal REs; and receiving a first reference signal using the first set of one or more reference signal REs, a second reference signal using the second set of one or more reference signal REs, and a control message using a set of REGs including the REG.

2. The method of claim 1, further comprising:
transmitting a first reference signal using the first set of one or more reference signal REs, a second reference signal using the second set of one or more reference signal REs, and a control message using a set of REGs including the REG.

3. The method of claim 2, further comprising:
performing interference cancellation for one or more REGs of the set of REGs.

4. The method of claim 3, further comprising:
calculating an interference covariance matrix for each of the one or more REGs, wherein the interference cancellation is performed based at least in part on the interference covariance matrix.

5. The method of claim 3, further comprising:
determining that a neighboring base station uses a reference signal configuration based on contiguous reference signal REs, wherein performing the interference cancellation is performed based at least in part on the determination.

6. The method of claim 5, further comprising:
coordinating an REG pattern with the neighboring base station or a core network entity, wherein the REG pattern prevents partially overlapping REGs from different base stations, and wherein the interference cancellation is performed based at least in part on the REG pattern.

7. The method of claim 5, further comprising:
coordinating an REG pattern with the neighboring base station or a core network entity, wherein the REG pattern minimizes a probability that two base stations use an overlapping REG, and wherein the interference cancellation is performed based at least in part on the REG pattern.

8. The method of claim 2, wherein the first reference signal is associated with a first antenna port and the second reference signal is associated with a second antenna port.

9. The method of claim 2, wherein
the control message is transmitted using a space frequency block code (SFBC); and
the SFBC is based at least in part on distributing a set of symbols of the control message to a set of RE pairs of the SFBC.

10. The method of claim 9, wherein each RE pair of the SFBC is separated by a reference signal RE of the first set of one or more reference signal REs or the second set of one or more reference signal REs.

11. The method of claim 9, wherein REs of each RE pair of the set of RE pairs are contiguous.

12. The method of claim 1, wherein the first set of one or more reference signal REs, the second set of one or more reference signal REs, and the REG comprise one or more resource blocks (RBs) of frequency tones.

13. The method of claim 12, wherein the first set of one or more reference signal REs and the second set of one or more reference signal REs combined comprise one half of the frequency tones of an RB.

14. The method of claim 12, wherein the first set of one or more reference signal REs and the second set of one or more reference signal REs combined comprise one third of the frequency tones of an RB.

15. The method of claim 1, wherein the symbol period comprises a first symbol period of a transmission time interval (TTI).

16. An apparatus for wireless communication comprising:
means for identifying a first set of one or more reference signal resource elements (REs) in a symbol period;
means for identifying a second set of one or more reference signal REs in the symbol period, wherein each reference signal RE of the first set of one or more reference signal REs is contiguous in frequency to a reference signal RE of the second set of one or more reference signal REs;
means for identifying a resource element group (REG) comprising a plurality of REs in the symbol period, wherein one or more REs of the REG is contiguous in frequency to a reference signal RE of the first set of one or more reference signal REs or a reference signal RE of the second set of one or more reference signal REs; and
means for receiving a first reference signal using the first set of one or more reference signal REs, a second reference signal using the second set of one or more reference signal REs, and a control message using a set of REGs including the REG.

17. The apparatus of claim 16, further comprising:
means for transmitting a first reference signal using the first set of one or more reference signal REs, a second reference signal using the second set of one or more reference signal REs and a control message using a set of REGs including the REG.

18. The apparatus of claim 17, further comprising:
means for performing interference cancellation for one or more REGs of the set of REGs.

19. The apparatus of claim 18, further comprising:
means for calculating an interference covariance matrix for each of the one or more REGs, wherein the interference cancellation is performed based at least in part on the interference covariance matrix.

20. The apparatus of claim 18, further comprising:
means for determining that a neighboring base station uses a reference signal configuration based on contiguous reference signal REs, wherein performing the interference cancellation is performed based at least in part on the determination.

21. The apparatus of claim 20, further comprising:
means for coordinating an REG pattern with the neighboring base station or a core network entity, wherein the REG pattern prevents partially overlapping REGs from different base stations, and wherein the interference cancellation is performed based at least in part on the REG pattern.

22. The apparatus of claim 20, further comprising:
means for coordinating an REG pattern with the neighboring base station or a core network entity, wherein the REG pattern minimizes a probability that two base stations use an overlapping REG, and wherein the interference cancellation is performed based at least in part on the REG pattern.

23. The apparatus of claim 17, wherein the first reference signal is associated with a first antenna port and the second reference signal is associated with a second antenna port.

24. The apparatus of claim 17, wherein
the control message is transmitted using a space frequency block code (SFBC); and
the SFBC is based at least in part on distributing a set of symbols of the control message to a set of RE pairs of the SFBC.

25. The apparatus of claim 24, wherein each RE pair of the SFBC is separated by a reference signal RE of the first set of one or more reference signal REs or the second set of one or more reference signal REs.

26. The apparatus of claim 24, wherein REs of each RE pair of the set of RE pairs are contiguous.

27. The apparatus of claim 16, wherein the first set of one or more reference signal REs, the second set of one or more reference signal REs, and the REG comprise one or more resource blocks (RBs) of frequency tones.

28. The apparatus of claim 27, wherein the first set of one or more reference signal REs and the second set of one or more reference signal REs combined comprise one half of the frequency tones of an RB.

29. The apparatus of claim 27, wherein the first set of one or more reference signal REs and the second set of one or more reference signal REs combined comprise one third of the frequency tones of an RB.

30. The apparatus of claim 16, wherein the symbol period comprises a first symbol period of a transmission time interval (TTI).

31. An apparatus for wireless communication, comprising:
a processor;
memory in electronic communication with the processor; and
the processor and memory configured to:
identify a first set of one or more reference signal resource elements (REs) in a symbol period;
identify a second set of one or more reference signal REs in the symbol period, wherein each reference signal RE of the first set of one or more reference signal REs is contiguous in frequency to a reference signal RE of the second set of one or more reference signal REs;
identify a resource element group (REG) comprising a plurality of REs in the symbol period, wherein one or more REs of the REG is contiguous in frequency to a reference signal RE of the first set of one or more reference signal REs or a reference signal RE of the second set of one or more reference signal REs; and
receive a first reference signal using the first set of one or more reference signal REs, a second reference signal using the second set of one or more reference signal REs, and a control message using a set of REGs including the REG.

32. The apparatus of claim 31, wherein the processor and memory are configured to:
transmit a first reference signal using the first set of one or more reference signal REs, a second reference signal using the second set of one or more reference signal REs and a control message using a set of REGs including the REG.

33. The apparatus of claim 32, wherein the processor and memory are configured to:
perform interference cancellation for one or more REGs of the set of REGs.

34. The apparatus of claim 33, wherein the processor and memory are configured to:
calculate an interference covariance matrix for each of the one or more REGs, wherein the interference cancellation is performed based at least in part on the interference covariance matrix.

35. The apparatus of claim 33, wherein the processor and memory are configured to:
determine that a neighboring base station uses a reference signal configuration based on contiguous reference signal REs, wherein performing the interference cancellation is performed based at least in part on the determination.

36. The apparatus of claim 35, wherein the processor and memory are configured to:
coordinate an REG pattern with the neighboring base station or a core network entity, wherein the REG pattern prevents partially overlapping REGs from different base stations, and wherein the interference cancellation is performed based at least in part on the REG pattern.

37. The apparatus of claim 35, wherein the processor and memory are configured to:
coordinate an REG pattern with the neighboring base station or a core network entity, wherein the REG pattern minimizes a probability that two base stations use an overlapping REG, and wherein the interference cancellation is performed based at least in part on the REG pattern.

38. The apparatus of claim 32, wherein the first reference signal is associated with a first antenna port and the second reference signal is associated with a second antenna port.

39. The apparatus of claim 32, wherein
the control message is transmitted using a space frequency block code (SFBC); and
the SFBC is based at least in part on distributing a set of symbols of the control message to a set of RE pairs of the SFBC.

40. The apparatus of claim 39, wherein each RE pair of the SFBC is separated by a reference signal RE of the first set of one or more reference signal REs or the second set of one or more reference signal REs.

41. The apparatus of claim 39, wherein REs of each RE pair of the set of RE pairs are contiguous.

42. The apparatus of claim 31, wherein the first set of one or more reference signal REs, the second set of one or more reference signal REs, and the REG comprise one or more resource blocks (RBs) of frequency tones.

43. The apparatus of claim 42, wherein the first set of one or more reference signal REs and the second set of one or more reference signal REs combined comprise one half of the frequency tones of an RB.

44. The apparatus of claim 42, wherein the first set of one or more reference signal REs and the second set of one or more reference signal REs combined comprise one third of the frequency tones of an RB.

45. The apparatus of claim 31, wherein the symbol period comprises a first symbol period of a transmission time interval (TTI).

46. A non-transitory computer-readable medium storing code for wireless communication, the code comprising instructions executable to:
identify a first set of one or more reference signal resource elements (REs) in a symbol period;
identify a second set of one or more reference signal REs in the symbol period, wherein each reference signal RE of the first set of one or more reference signal REs is contiguous in frequency to a reference signal RE of the second set of one or more reference signal REs;

identify a resource element group (REG) comprising a plurality of REs in the symbol period, wherein one or more REs of the REG is contiguous in frequency to a reference signal RE of the first set of one or more reference signal REs or a reference signal RE of the second set of one or more reference signal REs; and receive a first reference signal using the first set of one or more reference signal REs, a second reference signal using the second set of one or more reference signal REs, and a control message using a set of REGs including the REG.

47. The non-transitory computer-readable medium of claim 46, wherein the instructions are executable to:
transmit a first reference signal using the first set of one or more reference signal REs, a second reference signal using the second set of one or more reference signal REs and a control message using a set of REGs including the REG.

48. The non-transitory computer-readable medium of claim 47, wherein the instructions are executable to:
perform interference cancellation for one or more REGs of the set of REGs.

49. The non-transitory computer-readable medium of claim 48, wherein the instructions are executable to:
calculate an interference covariance matrix for each of the one or more REGs, wherein the interference cancellation is performed based at least in part on the interference covariance matrix.

50. The non-transitory computer-readable medium of claim 48, wherein the instructions are executable to:
determine that a neighboring base station uses a reference signal configuration based on contiguous reference signal REs, wherein performing the interference cancellation is performed based at least in part on the determination.

51. The non-transitory computer-readable medium of claim 50, wherein the instructions are executable to:
coordinate an REG pattern with the neighboring base station or a core network entity, wherein the REG pattern prevents partially overlapping REGs from different base stations, and wherein the interference cancellation is performed based at least in part on the REG pattern.

52. The non-transitory computer-readable medium of claim 50, wherein the instructions are executable to:
coordinate an REG pattern with the neighboring base station or a core network entity, wherein the REG pattern minimizes a probability that two base stations use an overlapping REG, and wherein the interference cancellation is performed based at least in part on the REG pattern.

53. The non-transitory computer-readable medium of claim 47, wherein the first reference signal is associated with a first antenna port and the second reference signal is associated with a second antenna port.

54. The non-transitory computer-readable medium of claim 47, wherein
the control message is transmitted using a space frequency block code (SFBC); and
the SFBC is based at least in part on distributing a set of symbols of the control message to a set of RE pairs of the SFBC.

55. The non-transitory computer-readable medium of claim 54, wherein each RE pair of the SFBC is separated by a reference signal RE of the first set of one or more reference signal REs or the second set of one or more reference signal REs.

56. The non-transitory computer-readable medium of claim 54, wherein REs of each RE pair of the set of RE pairs are contiguous.

57. The non-transitory computer-readable medium of claim 46, wherein the first set of one or more reference signal REs, the second set of one or more reference signal REs, and the REG comprise one or more resource blocks (RBs) of frequency tones.

58. The non-transitory computer-readable medium of claim 57, wherein the first set of one or more reference signal REs and the second set of one or more reference signal REs combined comprise one half of the frequency tones of an RB.

59. The non-transitory computer-readable medium of claim 57, wherein the first set of one or more reference signal REs and the second set of one or more reference signal REs combined comprise one third of the frequency tones of an RB.

60. The non-transitory computer-readable medium of claim 46, wherein the symbol period comprises a first symbol period of a transmission time interval (TTI).

* * * * *